United States Patent
Khoshnevisan et al.

(10) Patent No.: US 11,711,830 B2
(45) Date of Patent: Jul. 25, 2023

(54) RESOURCE SHARING BETWEEN TRANSMISSION HYPOTHESES

(71) Applicant: QUALCOMM Incorporated, San Diego, CA (US)

(72) Inventors: Mostafa Khoshnevisan, San Diego, CA (US); Chenxi Hao, Beijing (CN); Faris Rassam, El Cajon, CA (US); Lei Xiao, San Jose, CA (US); Tao Luo, San Diego, CA (US); Xiaoxia Zhang, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/683,030

(22) Filed: Feb. 28, 2022

(65) Prior Publication Data
US 2022/0322333 A1    Oct. 6, 2022

Related U.S. Application Data

(63) Continuation of application No. PCT/CN2021/084414, filed on Mar. 31, 2021.

(51) Int. Cl.
*H04L 12/28* (2006.01)
*H04W 72/51* (2023.01)
(Continued)

(52) U.S. Cl.
CPC .......... *H04W 72/51* (2023.01); *H04B 7/0473* (2013.01); *H04B 7/0486* (2013.01);
(Continued)

(58) Field of Classification Search
CPC ... H04B 7/0417; H04B 7/0626; H04L 1/0026; H04L 5/0035; H04L 5/0057; H04W 24/10; H04W 72/048; H04W 72/0453
(Continued)

(56) References Cited

U.S. PATENT DOCUMENTS

2017/0311307 A1* 10/2017 Negus ................. H04W 72/046
2021/0028823 A1   1/2021 Park et al.
(Continued)

FOREIGN PATENT DOCUMENTS

WO   WO2020060338 A1   3/2020

OTHER PUBLICATIONS

Huawei et al., "CSI Acquisition Details for NCJT", 3GPP TSG RAN WG1 Meeting #91, R1-1719815, Dec. 1, 2017 (Dec. 1, 2017), 7 Pages, The Whole Document.
(Continued)

*Primary Examiner* — John Pezzlo
(74) *Attorney, Agent, or Firm* — QUALCOMM Incorporated

(57) ABSTRACT

Methods, systems, and devices for wireless communications are described. A user equipment (UE) may indicate, to a base station, a capability of the UE to use a channel measurement resource for both a joint transmission hypothesis and a single transmission hypothesis. The UE may receive, based on indicating the capability of the UE, a configuration message indicating a first channel measurement resource that is associated with a first transmission configuration indicator state and that is configured for a first joint transmission hypothesis. The UE may obtain a channel measurement for both the first joint transmission hypothesis and a first single transmission hypothesis using the first channel measurement resource based on the configuration message.

30 Claims, 13 Drawing Sheets

(51) Int. Cl.
  *H04B 7/06* (2006.01)
  *H04W 72/0453* (2023.01)
  *H04W 72/044* (2023.01)
  *H04B 7/0456* (2017.01)
  *H04B 7/08* (2006.01)
  *H04W 72/542* (2023.01)
  *H04J 1/16* (2006.01)

(52) U.S. Cl.
  CPC ......... *H04B 7/0626* (2013.01); *H04B 7/0639* (2013.01); *H04B 7/0848* (2013.01); *H04W 72/046* (2013.01); *H04W 72/0453* (2013.01); *H04W 72/542* (2023.01)

(58) Field of Classification Search
  USPC .................... 370/252, 329, 386, 320, 430
  See application file for complete search history.

(56) References Cited

U.S. PATENT DOCUMENTS

| | | | |
|---|---|---|---|
| 2021/0028843 A1 | 1/2021 | Zhou et al. | |
| 2021/0167829 A1* | 6/2021 | Li | H04B 7/024 |
| 2021/0359742 A1* | 11/2021 | Mondal | H04B 7/0634 |
| 2022/0094399 A1* | 3/2022 | Gao | H04B 7/0486 |
| 2022/0140981 A1* | 5/2022 | Hindy | H04B 7/0639 |
| | | | 370/329 |

OTHER PUBLICATIONS

International Search Report and Written Opinion—PCT/CN2021/084414—ISA/EPO—dated Dec. 30, 2021.

* cited by examiner

RESOURCE SHARING BETWEEN TRANSMISSION HYPOTHESES

CROSS REFERENCE

The present application for patent is a Continuation of Chinese PCT Application No. PCT/CN2021/084414 by KHOSHNEVISAN et al., entitled "RESOURCE SHARING BETWEEN TRANSMISSION HYPOTHESES" filed Mar. 31, 2021, assigned to the assignee hereof, and expressly incorporated by reference in its entirety herein.

FIELD OF TECHNOLOGY

The following relates to wireless communications, including resource sharing between transmission hypotheses.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may send channel state information (CSI) reports to a base station. Techniques for improving CSI reporting may be desired.

SUMMARY

The described techniques relate to improved methods, systems, devices, and apparatuses that support resource sharing between transmission hypotheses. A user equipment (UE) may determine whether the UE is capable of sharing a channel measurement resource between multiple hypotheses and transmit an indication of the UE's capability to a base station. The UE may also indicate to the base station a capability of the UE to share various aspects associated with the channel measurement resources (e.g., channel station information processing units (CPUs), resources, antenna ports) between hypotheses. The base station may configure the UE with one or more channel state information report configurations based on the capabilities of the UE.

A method for wireless communication at a UE is described. The method may include indicating, to a base station, a capability of the UE to use a channel measurement resource for both a joint transmission hypothesis and a single transmission hypothesis, receiving, based on indicating the capability of the UE, a configuration message indicating a first channel measurement resource that is associated with a first transmission configuration indicator state and that is configured for a first joint transmission hypothesis, and obtaining a channel measurement for both the first joint transmission hypothesis and a first single transmission hypothesis using the first channel measurement resource based on the configuration message.

An apparatus for wireless communication at a UE is described. The apparatus may include a processor, memory coupled with the processor, and instructions stored in the memory. The instructions may be executable by the processor to cause the apparatus to indicate, to a base station, a capability of the UE to use a channel measurement resource for both a joint transmission hypothesis and a single transmission hypothesis, receive, based on indicating the capability of the UE, a configuration message indicating a first channel measurement resource that is associated with a first transmission configuration indicator state and that is configured for a first joint transmission hypothesis, and obtain a channel measurement for both the first joint transmission hypothesis and a first single transmission hypothesis using the first channel measurement resource based on the configuration message.

Another apparatus for wireless communication at a UE is described. The apparatus may include means for indicating, to a base station, a capability of the UE to use a channel measurement resource for both a joint transmission hypothesis and a single transmission hypothesis, means for receiving, based on indicating the capability of the UE, a configuration message indicating a first channel measurement resource that is associated with a first transmission configuration indicator state and that is configured for a first joint transmission hypothesis, and means for obtaining a channel measurement for both the first joint transmission hypothesis and a first single transmission hypothesis using the first channel measurement resource based on the configuration message.

A non-transitory computer-readable medium storing code for wireless communication at a UE is described. The code may include instructions executable by a processor to indicate, to a base station, a capability of the UE to use a channel measurement resource for both a joint transmission hypothesis and a single transmission hypothesis, receive, based on indicating the capability of the UE, a configuration message indicating a first channel measurement resource that is associated with a first transmission configuration indicator state and that is configured for a first joint transmission hypothesis, and obtain a channel measurement for both the first joint transmission hypothesis and a first single transmission hypothesis using the first channel measurement resource based on the configuration message.

Some examples of the method, apparatuses, and non-transitory computer-readable medium described herein may further include operations, features, means, or instructions for transmitting, to the base station, a channel state information report for the first joint transmission hypothesis or for the first single transmission hypothesis, the channel state information report based on the channel measurement obtained using the first channel measurement resource.

Some examples of the method, apparatuses, and non-transitory computer-readable medium described herein may further include operations, features, means, or instructions for determining that the UE supports simultaneous multi-beam reception and determining the capability of the UE based on the UE supporting simultaneous multi-beam reception.

In some examples of the method, apparatuses, and non-transitory computer-readable medium described herein, the configuration message indicates a set of multiple channel measurement resources including the first channel measurement resource and the method, apparatuses, and non-transitory computer-readable medium may include further operations, features, means, or instructions for receiving a second configuration message that enables single transmission hypotheses for the set of multiple channel measurement resources on an individual basis.

In some examples of the method, apparatuses, and non-transitory computer-readable medium described herein, the configuration message indicates a set of multiple channel measurement resources including the first channel measurement resource and the method, apparatuses, and non-transitory computer-readable medium may include further operations, features, means, or instructions for receiving a second configuration message including a flag that enables single transmission hypotheses for each channel measurement resource in the set of multiple channel measurement resources.

In some examples of the method, apparatuses, and non-transitory computer-readable medium described herein, the configuration message indicates a set of multiple pairs of channel measurement resources corresponding to respective joint transmission hypotheses and the method, apparatuses, and non-transitory computer-readable medium may include further operations, features, means, or instructions for receiving a second configuration message that disables single transmission hypotheses for one or more pairs of the set of multiple pairs.

Some examples of the method, apparatuses, and non-transitory computer-readable medium described herein may further include operations, features, means, or instructions for determining, based on the capability of the UE and a default configuration, that the first channel measurement resource corresponds to the first single transmission hypothesis.

In some examples of the method, apparatuses, and non-transitory computer-readable medium described herein, the capability applies to a frequency range supported by the UE.

Some examples of the method, apparatuses, and non-transitory computer-readable medium described herein may further include operations, features, means, or instructions for determining the capability of the UE based on a channel state information reporting capability of the UE.

Some examples of the method, apparatuses, and non-transitory computer-readable medium described herein may further include operations, features, means, or instructions for indicating a second capability of the UE to use a channel measurement resource for multiple joint transmission hypotheses.

Some examples of the method, apparatuses, and non-transitory computer-readable medium described herein may further include operations, features, means, or instructions for indicating a quantity transmission hypotheses for which the UE may be capable of using a channel measurement resource.

Some examples of the method, apparatuses, and non-transitory computer-readable medium described herein may further include operations, features, means, or instructions for indicating, to the base station based on the capability of the UE, a second capability of the UE to share at least one of processing unit occupation, resource occupation, or port occupation between the first joint transmission hypothesis and the first single transmission hypothesis.

Some examples of the method, apparatuses, and non-transitory computer-readable medium described herein may further include operations, features, means, or instructions for determining the second capability of the UE based on the first joint transmission hypothesis and the first single transmission hypothesis being configured with the same resources for interference measurements.

Some examples of the method, apparatuses, and non-transitory computer-readable medium described herein may further include operations, features, means, or instructions for determining the second capability of the UE based on a technique used by the UE to determine a first precoding matrix indicator (PMI) for the first joint transmission hypothesis and a second PMI for the first joint transmission hypothesis.

In some examples of the method, apparatuses, and non-transitory computer-readable medium described herein, separately determining a first precoding matrix indicator (PMI) for the first joint transmission hypothesis and a second PMI for the first joint transmission hypothesis, where the second capability of the UE may be based on separately determining the first PMI and the second PMI.

Some examples of the method, apparatuses, and non-transitory computer-readable medium described herein may further include operations, features, means, or instructions for determining a first PMI for the first joint transmission hypothesis based on a second PMI for the first joint transmission hypothesis, where the second capability of the UE may be based on determining the first PMI based on the second PMI.

In some examples of the method, apparatuses, and non-transitory computer-readable medium described herein, jointly determining a first PMI for the first joint transmission hypothesis and a second PMI for the first joint transmission hypothesis, where the second capability of the UE may be based on jointly determining the first PMI and the second PMI.

Some examples of the method, apparatuses, and non-transitory computer-readable medium described herein may further include operations, features, means, or instructions for determining, based on the configuration message, a second channel measurement resource configured for the first joint transmission hypothesis and a second single transmission hypothesis, where the second capability applies to the first channel measurement resource or the second channel measurement resource.

Some examples of the method, apparatuses, and non-transitory computer-readable medium described herein may further include operations, features, means, or instructions for determining, based on the configuration message, that the first channel measurement resource may be configured for a second joint transmission hypothesis and indicating, to the base station, a second capability of the UE to share at least one of processing unit occupation, resource occupation, or port occupation between the first joint transmission hypothesis and the second joint transmission hypothesis.

Some examples of the method, apparatuses, and non-transitory computer-readable medium described herein may further include operations, features, means, or instructions for receiving radio resource control (RRC) signaling that enables or disables the second capability of the UE.

A method for wireless communication at a base station is described. The method may include receiving an indication of a capability of a UE to use a channel measurement resource for both a joint transmission hypothesis and a single transmission hypothesis and indicating, to the UE, a first channel measurement resource that is associated with a first transmission configuration indicator state, where the first channel measurement resource is configured for a first joint transmission hypothesis and a first single transmission hypothesis based on the capability of the UE.

An apparatus for wireless communication at a base station is described. The apparatus may include a processor, memory coupled with the processor, and instructions stored in the memory. The instructions may be executable by the processor to cause the apparatus to receive an indication of a capability of a UE to use a channel measurement resource for both a joint transmission hypothesis and a single transmission hypothesis and indicate, to the UE, a first channel measurement resource that is associated with a first transmission configuration indicator state, where the first channel measurement resource is configured for a first joint transmission hypothesis and a first single transmission hypothesis based on the capability of the UE.

Another apparatus for wireless communication at a base station is described. The apparatus may include means for receiving an indication of a capability of a UE to use a channel measurement resource for both a joint transmission hypothesis and a single transmission hypothesis and means for indicating, to the UE, a first channel measurement resource that is associated with a first transmission configuration indicator state, where the first channel measurement resource is configured for a first joint transmission hypothesis and a first single transmission hypothesis based on the capability of the UE.

A non-transitory computer-readable medium storing code for wireless communication at a base station is described. The code may include instructions executable by a processor to receive an indication of a capability of a UE to use a channel measurement resource for both a joint transmission hypothesis and a single transmission hypothesis and indicate, to the UE, a first channel measurement resource that is associated with a first transmission configuration indicator state, where the first channel measurement resource is configured for a first joint transmission hypothesis and a first single transmission hypothesis based on the capability of the UE.

Some examples of the method, apparatuses, and non-transitory computer-readable medium described herein may further include operations, features, means, or instructions for receiving a channel state information report for the first joint transmission hypothesis or for the first single transmission hypothesis, the channel state information report based on a channel measurement obtained using the first channel measurement resource.

In some examples of the method, apparatuses, and non-transitory computer-readable medium described herein, a first configuration message indicates a set of multiple channel measurement resources including the first channel measurement resource and the method, apparatuses, and non-transitory computer-readable medium may include further operations, features, means, or instructions for transmitting a second configuration message that enables single transmission hypotheses for the set of multiple channel measurement resources on an individual basis.

In some examples of the method, apparatuses, and non-transitory computer-readable medium described herein, a first configuration message indicates a set of multiple channel measurement resources including the first channel measurement resource and the method, apparatuses, and non-transitory computer-readable medium may include further operations, features, means, or instructions for transmitting a second configuration message including a flag that enables single transmission hypotheses for each channel measurement resource in the set of multiple channel measurement resources.

In some examples of the method, apparatuses, and non-transitory computer-readable medium described herein, a first configuration message indicates a set of multiple pairs of channel measurement resources corresponding to respective joint transmission hypotheses and the method, apparatuses, and non-transitory computer-readable medium may include further operations, features, means, or instructions for transmitting a second configuration message that disables single transmission hypotheses for one or more pairs of the set of multiple pairs.

Some examples of the method, apparatuses, and non-transitory computer-readable medium described herein may further include operations, features, means, or instructions for receiving an indication of a second capability of the UE to use a channel measurement resource for multiple joint transmission hypotheses and configuring the first channel measurement resource for a second joint transmission hypothesis based on the second capability of the UE.

Some examples of the method, apparatuses, and non-transitory computer-readable medium described herein may further include operations, features, means, or instructions for receiving an indication of a quantity of transmission hypotheses for which the UE may be capable of using a channel measurement resource and configuring the first channel measurement resource for a second joint transmission hypothesis or a second single transmission hypothesis based on the quantity of transmission hypotheses.

Some examples of the method, apparatuses, and non-transitory computer-readable medium described herein may further include operations, features, means, or instructions for receiving an indication of a second capability of the UE to share at least one of processing unit occupation, resource occupation, or port occupation between the first joint transmission hypothesis and the first single transmission hypothesis and configuring the UE with one or more channel state information report configurations based on the second capability.

In some examples of the method, apparatuses, and non-transitory computer-readable medium described herein, the indication of the second capability indicates the first channel measurement resource.

Some examples of the method, apparatuses, and non-transitory computer-readable medium described herein may further include operations, features, means, or instructions for receiving an indication of a second capability of the UE to share at least one of processing unit occupation, resource occupation, or port occupation between the first joint transmission hypothesis and a second joint transmission hypothesis and configuring the UE with one or more channel state information report configurations based on the second capability.

DETAILED DESCRIPTION

In some wireless communications systems, a user equipment (UE) may report channel state information (CSI) to a base station to improve communications. The UE may determine the CSI by performing channel measurements and interference measurements. For example, the UE may measure channel state information reference signals (CSI-RS) in resources configured for channel measurements, which may be referred to as channel measurement resources (CMRs). The UE may also measure interference during resources configured for interference measurements, which may be referred to as interference measurement resources (IMRs). Each CMR may be associated with a respective transmission configuration indicator (TCI) state and/or transmission reception point (TRP). Each CMR may also have a corresponding IMR (e.g., as configured by the base station).

The UE may generate CSI for a multi-TRP (mTRP) hypothesis that corresponds to a pair of CMRs. An mTRP hypothesis may also be referred to as joint transmission hypothesis or a non-coherent joint transmission (NCJT) hypothesis. In some examples, it may be beneficial for a CMR corresponding to an NCJT hypothesis to also be used for a single-TRP (sTRP) hypothesis, which may also be referred to as a single transmission hypothesis or a non-joint transmission hypothesis. Use of a CMR for multiple hypotheses (e.g., an NCJT hypothesis and an sTRP hypothesis) may be referred as CMR re-use or CMR sharing and may involve using the channel measurement from the CMR for each of the hypotheses. However, the UE may not be capable of sharing CMRs in certain scenarios. For example, the UE may not support CMR sharing if the UE does not support simultaneous multi-beam reception (e.g., a technique in which the UE simultaneously uses multiple receive beams to receive a single transmission).

According to the techniques described herein, a UE may indicate to a base station an ability of the UE to share CMRs between hypotheses. If the UE supports CMR sharing, the UE may also indicate an ability of the UE to share various aspects associated with a CMR (e.g., CSI processing unit (CPU) occupation, resource occupation, and/or port occupation) between hypotheses. Thus, the base station may configure the UE with one or more CSI reports based on the indicated capabilities of the UE, which may improve CSI reporting.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to resource sharing between transmission hypotheses.

Figure 1:
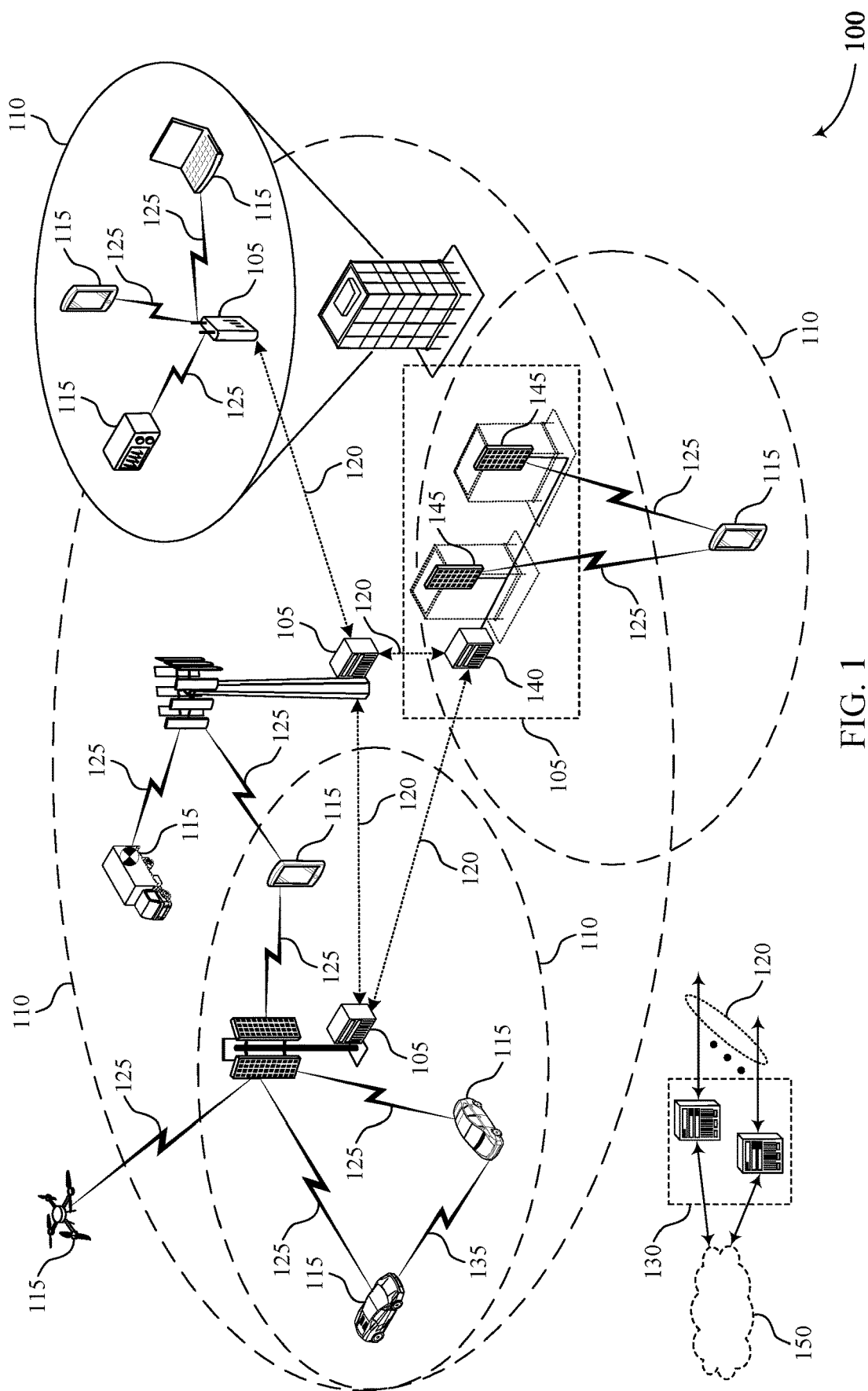
FIG. 1 illustrates an example of a wireless communications system that supports resource sharing between transmission hypotheses in accordance with aspects of the present disclosure.

FIG. 1 illustrates an example of a wireless communications system 100 that supports resource sharing between transmission hypotheses in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a base station may send to a UE 115 a CSI report configuration that configures resources for a CSI report. The CSI report configuration may be linked to one or more resource settings, each of which may have an active resource set. For example, the CSI report configuration may be linked to a single resource setting (e.g., a resource setting for CMR), to two resource settings (e.g., a resource setting for CMR and a resource setting for CSI-IM or non-zero-power IMR (NZP-IMR)), or to three resource settings (e.g., a resource setting for CMR, a resource setting for CSI-IM, and a resource setting for NZP-IMR). Each resource setting may have multiple resource sets, one of which may be an active resource set that the UE 115 is to use for CSI measurements. For example, an CMR resource setting may have n CMR resource sets, one of which may be configured for channel measurements. A CSI-IM resource setting may have m CSI-IM resource sets, one of which may be configured for interference measurements. And an NZP-IMR resource setting may have s NZP-IMR resource sets, one of which is configured for interference measurements. An active resource set may include one or more active resources (e.g., x resources).

Each CMR resource in a CMR resource set may be associated with (e.g., correspond to, be configured with) a respective transmission configuration indicator (TCI) state that includes information about quasi-co-location (QCL) relationships between downlink reference signals and/or ports. A TCI state may also be referred to as a transmission reception point (TRP). Thus, each CMR resource may be associated with a TRP. A CMR may also be associated with a respective CSI-IM resource (referred to henceforth as an IMR) from the active CSI-IM resource set. For example, each CMR may have a corresponding IMR in that each CMR may be resource-wise associated with an IMR resource (e.g., by the ordering of the CMR and the IMR in the corresponding resource sets).

A UE 115 may be configured to provide one or more CSI reports corresponding to various hypotheses, such as sTRP hypotheses and NCJT hypotheses. A hypothesis may also be referred to as a transmission hypothesis, a measurement hypothesis, a CSI hypothesis, or other suitable terminology. A UE 115 may be capable of supporting one or more CSI reporting techniques or options.

In a first CSI reporting option (referred to as Option 1), the UE 115 may be configured to report a CSI report for the NCJT hypotheses configured for the UE 115 and X (e.g., 0, 1, 2) CSI reports for sTRP hypotheses configured for the UE 115. A CSI report for an NCJT (referred to as an NCJT CSI report) may be a CSI report that is associated with multiple (e.g., two) CMRs, which in turn may be configured with two corresponding TCI states associated with two TRPs, respectively. In Option 1, the UE 115 may generate CSI for each NCJT hypothesis and select one CSI (e.g., the best CSI) to report to the base station 105. If X is equal to zero (e.g., the UE 115 is configured to provide zero CSI reports for the sTRP hypotheses), the UE 115 may not generate CSI for any of the sTRP hypotheses.

In a second CSI reporting option (referred to as Option 2), the UE 115 may be configured to report a single (e.g., best) CSI report for the collection of NCJT and sTRP hypotheses configured for the UE 115. In either Option 1 or Option 2, a CSI report may include a CSI-RS resource indicator (CRI) that indicates the CSI-RS resource (e.g., the CMR) to which the CSI report corresponds.

If the TRPs associated with a UE 115 support joint transmissions (e.g., non-coherent joint transmissions), a pair of CMR resources in the CMR resource set may be configured for an NCJT hypothesis associated with those TRPs. The CMRs that make up a pair of CMR resources for an NCJT hypothesis may be selected from two groups of CMR resources determined by the base station 105. For example, one CMR in an NCJT pair may be selected from the first group and the other CMR may be selected from the second group. In some examples, the first group includes $K_1$ CMRs and the second group includes $K_2$ CMRs, where the total quantity of active CMRs (denoted $K_s$) is $K_1$ plus $K_2$. So, a UE 115 may be configured with a pair of CMRs (e.g., a first CMR and a second CMR) that correspond to an NCJT hypothesis.

In some examples, it may be beneficial for a CMR corresponding to the NCJT hypothesis to also be used for an sTRP hypothesis. Use of a CMR for multiple hypotheses (e.g., an NCJT hypothesis and an sTRP hypothesis) may be referred as CMR re-use or CMR sharing. However, the UE 115 may not be capable of sharing CMRs in certain scenarios. For example, the UE 115 may not support CMR sharing if the UE 115 does not support simultaneous multi-beam reception (e.g., a technique in which the UE uses multiple receive beams to receive a single transmission).

The ability of the UE 115 to support simultaneous multi-beam reception may vary with the frequency band over which the UE 115 operates. For example, the UE 115 may support simultaneous multi-beam reception when the UE 115 operates in a relatively low frequency band (e.g., frequency range 1 (FR1), which may cover frequencies less than 6 GHz) but may not support simultaneous multi-beam reception when the UE 115 operates in a relatively high frequency band (e.g., frequency range 2 (FR2), which may cover 24.4 GHz to 52.6 GHz). Thus, the capability of a UE 115 to share CMRs may be frequency range-specific, and in some examples may depend on multi-panel implementation at the UE 115. For instance, when receiving a first CMR (CMR0) that is configured for an sTRP hypothesis, the UE 115 may use two antenna panels simultaneously to receive CMR0 (e.g., the UE 115 may use two receive beams, which may be considered one effective receive beam). However, if CMR0 is also used together with a second CMR (CMR1) for an NCJT hypothesis, the UE 115 may use one panel (panel 0) to receive CMR0 and one panel (panel 1) to receive CMR1. In such a scenario, the UE 115 may not be able to optimize the receive beam on panel 0 for the effective receive beam previously described, which may be different.

According to the techniques described herein, a UE 115 may indicate to a base station 105 an ability of the UE 115 to share CMRs between multiple hypotheses. In response, the base station 105 may configure the UE 115 with one or more CMR(s) that correspond to multiple hypotheses (e.g., NCJT hypotheses and sTRP hypotheses), Thus, the techniques describe herein may allow for more efficient utilization of communication resources that are associated with CSI reporting.

If a UE 115 supports CMR sharing, the UE 115 may also indicate an ability of the UE 115 to share other aspects between hypotheses.

As noted, a UE 115 may generate CSI according to one or more CSI report configurations. A CSI report configuration may occupy a quantity of CSI processing resources (CPUs) at the UE 115 and may be associated with a quantity of active resources (e.g., CMRs) and a quantity of active ports. The UE 115 may support a maximum quantity of CPUs, denoted $N_{CPU}$, which may represent the maximum quantity of simultaneous CSI calculations the UE 115 can perform. The UE 115 may also support a maximum quantity of active resources ($N_{RES}$) and a maximum quantity of active ports ($N_{PORT}$).

A UE 115 may monitor the quantity of CPUs, active resources, and active ports occupied by the CSI report configurations for the UE 115 and use outdated CSI for a CSI report (or take some other mitigating measure) if any of these quantities exceeds the corresponding maximum supported by the UE 115. For example, if the CPUs occupied by a CSI configuration cause the total quantity of occupied CPUs (denoted $O_{CPU}$) to exceed $N_{CPU}$, the UE 115 may use outdated CSI for the CSI report associated with that CSI configuration. $O_{CPU}$ may be based on the quantity of CSI reports configured for the UE 115. To determine the total quantity of occupied CPUs ($O_{CPU}$), the UE 115 may count the quantity of CPUs associated with each CSI report configuration for the UE 115. Similarly, the UE 115 may determine the total quantity of occupied active resources ($O_{RES}$) by counting the quantity of active resources associated with each CSI report configuration for the UE 115. And the UE 115 may determine the total quantity of occupied active ports ($O_{PORT}$) by counting the quantity of active ports associated with each CSI report configuration for the UE 115.

In some examples, a UE 115 may indicate $N_{CPU}$, $N_{RES}$, and/or $N_{PORT}$ to a base station 105 so that the base station 115 can appropriately configure the UE 115 with CSI report configurations. For example, the base station 115 may configure the UE 115 with CSI report configurations that do not exceed $N_{CPU}$, $N_{RES}$, and $N_{PORT}$.

In some examples, an NCJT hypothesis may occupy two CPUs (since there are two PMI calculations), two active resources, and a quantity of active ports that corresponds to both CMRs in the CMR pair for the NCJT hypothesis. If a UE 115 shares a CMR between hypotheses, the UE 115 may be able to re-use (for counting purposes) the CPU(s), active resource(s), and/or active port(s) occupied by one of the hypotheses for the other hypothesis (e.g., rather than counting the CPU(s), active resource(s), and/or active port(s) separately, which may result in double-counting). Such re-use may be referred to as CPU/resource/port (CRP) occupation sharing. A UE 115 that supports CRP occupation sharing may indicate the CRP occupation sharing capability of the UE 115 to a base station 105 so that the base station 105 can account for the CRP occupation sharing when configuring the UE 115 with CSI report configurations, among other reasons.

Figure 2:
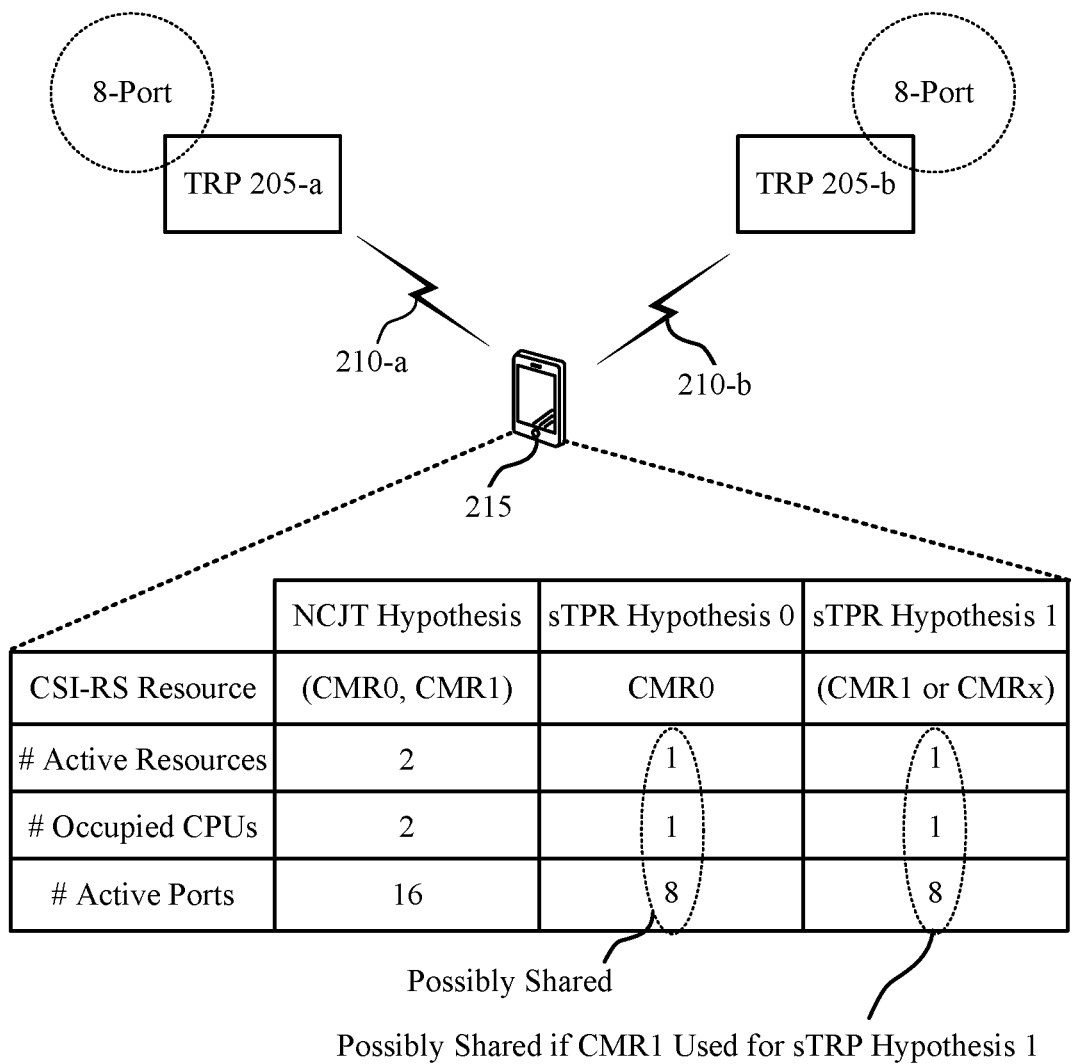
FIG. 2 illustrates an example of a wireless communications system that supports resource sharing between transmission hypotheses in accordance with aspects of the present disclosure.

FIG. 2 illustrates an example of a wireless communications system 200 that supports resource sharing between transmission hypotheses in accordance with aspects of the present disclosure. The wireless communications system 200 may include TRP 205-a and TRP 205-b as well as a UE 215. The UE 215 may support CMR sharing and CRP occupation sharing. The UE 215 may receive communications from TRP 205-a (e.g., over communication link 210-b) and TRP 205-b (e.g., over communication link 210-b). The communications from TRP 205-a and TRP 205-b may be at least partially coordinated by a base station associated with TRP 205-a and TRP 205-b. TRP 205-a and TRP 205-b may have or be associated with one or more antenna ports (e.g., eight antenna ports).

In some examples, the UE 215 may receive separate (non-joint, single) communications from TRP 205-a and TRP 205-b, where a separate communication is a communication from one of the TRPs 205 independent of the other TRP 205. In some examples, the UE 215 may receive joint communications from the TRPs 205, where a joint communication is a communication from both the TRPs 205. Thus, the TRPs 205 may be configured to support separate transmissions and joint transmissions. In some examples, the TRPs 205 may be configured to support coherent joint transmissions, non-coherent joint transmissions, or both. A coherent joint transmission may be a transmission in which transmission weights at the TRPs 205 are selected (based on knowledge of the channels between the UE 215 and the TRPs 205) to focus the energy at the UE 215 (e.g., in a type of non-co-located beamforming). A non-coherent joint transmission may be a transmission in which the TRPs 205 cooperate to increase the power gain of the transmission, to increase the rank that the UE 215 may be able to receive (for capacity enhancements), or to increase the diversity of the transmission (e.g. for reliability enhancements especially when the signal from one of the TRPs may be blocked due to harsh propagation environment).

The UE 215 may receive a CSI report configuration that indicates CMRs (referred to as CSI-RS resources in FIG. 2) that the UE 215 is to use for one or more CSI reports. For example, the CSI report configuration may indicate a first CMR (CMR0) and a second CMR (CMR1) that correspond to an NCJT hypothesis. CMR0 may be associated with TRP 205-a and a first TCI state (TCI state 0) configured for TRP 205-a. CMR1 may be associated with TRP 205-b and a second TCI state (TCI state 1) configured for TRP 205-b. A UE such as the UE 215 may determine one or more channel characteristics by measuring a CSI-RS that is contained in a CMR.

As an example, the UE 215 may measure a CSI-RS in CMR0 and a CSI-RS in CMR1. The UE 215 may use the measurements to determine one or more CSI parameters for the NCJT hypothesis, such as one or more PMIs. In some cases, it may be advantageous for the UE 215 to employ CMR sharing so that the UE 215 can use the measurements for the NCJT hypothesis for another hypothesis, such as an sTRP hypothesis. To enable CMR sharing UE 215 may indicate (to the base station associated with TRP 205-a and TRP 205-b) an ability of the UE 215 to support CMR sharing. An ability of a UE to support CMR sharing may be referred to as a CMR sharing capability.

If the UE 215 supports CMR sharing the UE 215 may use CMR0 for sTRP hypothesis 0, which may correspond to TRP 205-a, and may use CMR1 or a different CMR (e.g., CMRx) for sTRP hypothesis 1. The UE 215 may implement CMR sharing if configured to do so by the base station or as a default, as described in more detail with reference to FIG. 3. If the UE 215 does not support CMR sharing the UE 215 may use CMRs other than CMR0 and CMR1 for the sTRP hypotheses.

If the UE 215 implements CMR sharing, the UE 215 may determine whether CRP occupation sharing is supported by the UE 215. The ability of a UE to support CRP occupation sharing may be referred to as a CRP occupation sharing capability.

In the depicted example, the NCJT hypothesis may occupy two active resources (CMR0 and CMR1), two CPUs, and sixteen active ports (e.g., eight for each TRP). The sTRP hypothesis 0 may occupy one active resource (CMR0), one CPU, and eight active ports. And the sTRP hypothesis 1 may occupy one active resource (CMR1 or CMRx), one CPU, and eight active ports. All quantities described herein are for illustrative purposes and are not limiting.

If CRP occupation sharing is not supported by the UE 215, the UE 215 may determine $O_{RES}$, $O_{CPU}$, and $O_{PORT}$ by separately counting the active resources, CPUs, and active ports occupied by each of the hypotheses (e.g., the NCJT hypothesis may be considered separately from the sTRP hypotheses). Put another way, the UE 215 may count the active resources, CPUs, and active ports associated with a CMR Y times, where Y is the quantity of hypotheses that implicate or refer to the CMR. For example, the UE 215 may determine $O_{RES}$ by adding the active resources occupied by the NCJT hypothesis (e.g., two), the active resources occupied by sTRP hypothesis 0 (e.g., one), and the active resources occupied by sTRP hypothesis 1 (e.g., one). The UE 215 may determine $O_{CPU}$ by adding the CPUs occupied by the NCJT hypothesis (e.g., two), the CPUs occupied by sTRP hypothesis 0 (e.g., one), and the CPUs occupied by sTRP hypothesis 1 (e.g., one). And the UE 215 may determine $O_{PORT}$ by adding the active ports occupied by the NCJT hypothesis (e.g., sixteen), the active ports occupied by sTRP hypothesis 0 (e.g., eight), and the active ports occupied by sTRP hypothesis 1 (e.g., eight). Thus, for the case where the UE does not support CRP occupation sharing, the UE 215 may determine that $O_{RES}$ is four, $O_{CPU}$ is four, and $O_{PORT}$ is 32.

If CRP sharing is supported by the UE 215, the UE 215 may determine $O_{RES}$, $O_{CPU}$, and $O_{PORT}$ by re-using, for the purposes of counting, active resources, CPUs, and active ports occupied by one or more hypotheses. For example, the UE 215 may count the active resources, CPUs, and/or active ports associated with a CMR Y' times, where Y' is less than Y (which is the quantity of hypotheses that implicate the CMR).

For example, if the UE 215 shares CMR0 (but not CMR1) as shown in FIG. 2, the UE 215 may determine $O_{RES}$ by adding the active resources occupied by the NCJT hypothesis (e.g., two) and the active resources occupied by sTRP hypothesis 1 (e.g., one). The UE 215 may ignore, for counting purposes, the active resources occupied by sTRP hypothesis 0 (e.g., the sTRP hypothesis that shares CMR0) so that the active resources are not double-counted. The UE 215 may determine $O_{CPU}$ by adding the CPUs occupied by the NCJT hypothesis (e.g., two) and the CPUs occupied by sTRP hypothesis 1 (e.g., one). The UE 215 may ignore, for counting purposes, the CPUs occupied by sTRP hypothesis 0 so that the CPUs are not double-counted. The UE 215 may determine $O_{PORT}$ by adding the active ports occupied by the NCJT hypothesis (e.g., sixteen) and the active ports occupied by sTRP hypothesis 1 (e.g., eight). The UE 215 may ignore, for counting purposes, the active ports occupied by sTRP hypothesis 0 so that the active ports are not double-counted. So, when CMR0 is implicated by two hypotheses (e.g., Y=2), the active resources, CPUs, and active ports associated with CMR0 may be counted once (e.g., Y'=1).

Thus, for the case where the UE 215 supports CRP occupation sharing, the UE 215 may determine that $O_{RES}$ is three, $O_{CPU}$ is three, and $O_{PORT}$ is 24. By reporting the CRP occupation sharing capability to a base station, the UE 215 may enable the base station to configure the UE 215 with CSI report configurations that would otherwise exceed $N_{RES}$, $N_{CPU}$, and $N_{PORT}$. Although described with reference to CMR0, the UE 215 may also use CRP occupation sharing for the active resources, CPUs, and active ports associated with CMR1 (in the scenario in which the UE 215 shares CMR1 between the NCJT hypothesis and sTRP hypothesis 1). In such a scenario, the UE 215 may determine that $O_{RES}$ is two, $O_{CPU}$ is two, and $O_{PORT}$ is 16.

Figure 3:
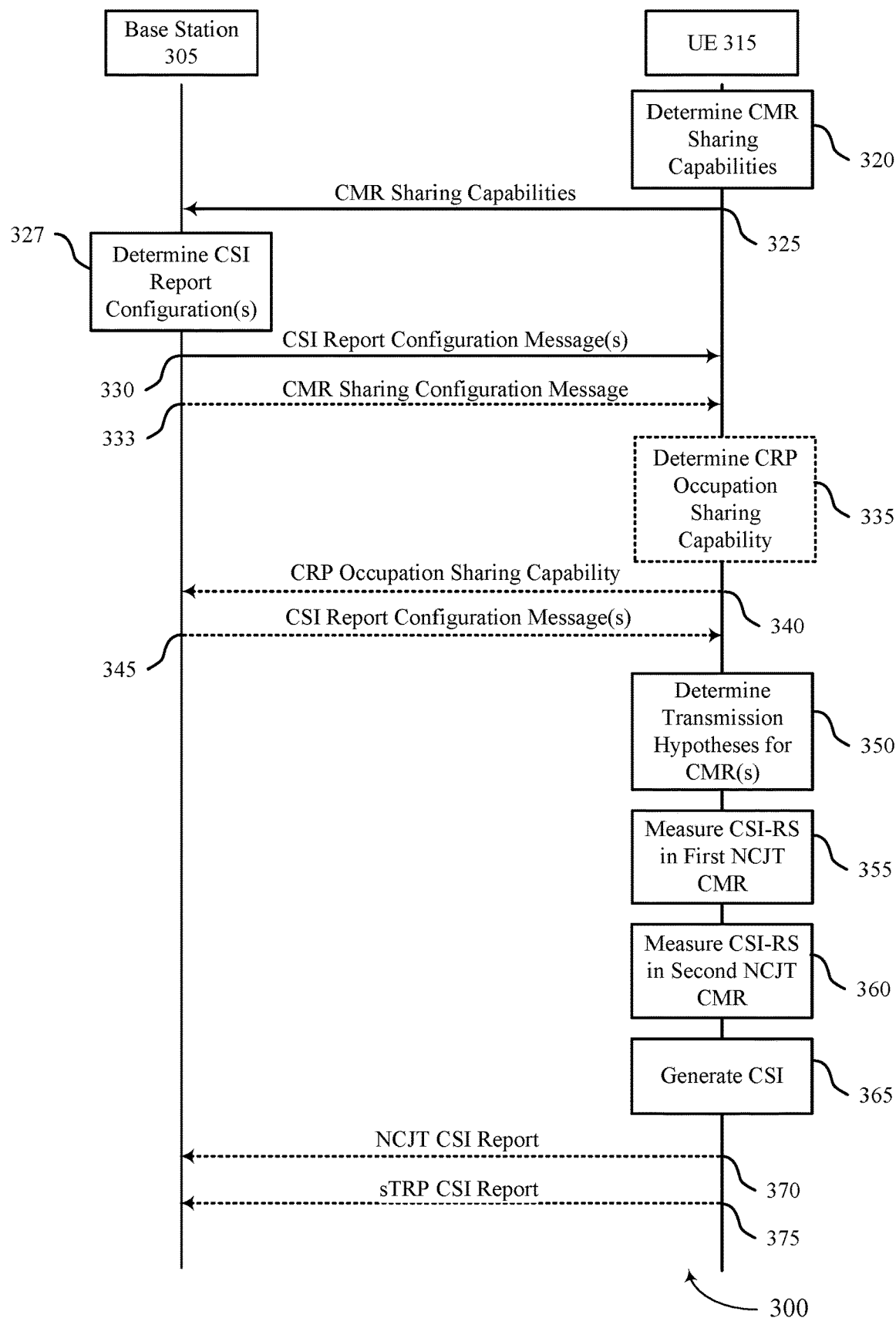
FIG. 3 illustrates an example of a process flow that supports resource sharing between transmission hypotheses in accordance with aspects of the present disclosure.

The ability of the UE 215 to support CRP sharing may be based on one or more factors as described with more detail herein and with reference to FIG. 3.

FIG. 3 illustrates an example of a process flow 300 that supports resource sharing between transmission hypotheses in accordance with aspects of the present disclosure. In some examples, the process flow 300 may be related to aspects of the wireless communications system 100 or the wireless communications system 200. For example, the process flow 300 may be implemented by a base station 305 and a UE 315, which may be examples of a base station and a UE as described herein. The base station 305 may be associated with one or more TRPs.

At 320, the UE 315 may determine a CMR sharing capability of the UE 315. The UE 315 may determine the CMR sharing capability of the UE 315 based on the frequency range in which the UE 315 is operating, based on the ability of the UE 315 to support simultaneous multi-beam reception, and/or based on the panel implementation at the UE 315, among other parameters. In some examples, the CMR sharing capability of the UE 315 may be per band or frequency-range specific. For example, the CMR sharing capability may apply to a particular frequency range (e.g., FR2) but not others. In some examples, the CMR sharing capability of the UE 315 may depend on (e.g., be a function of, be conditioned on) the CSI reporting capabilities of the UE 315. For example, the UE 315 may not support CMR sharing if the UE 315 only supports CSI reporting Option 1 with X=0 (e.g., because zero sTRP hypotheses are configured for CSI reporting). However, the UE 315 may support CMR sharing if the UE 315 supports CSI reporting Option 2 or Option 1 with X=1 or X=2.

In some examples, the UE 315 may determine a second CMR sharing capability of the UE 315. The second CMR sharing capability may be a capability of the UE 315 to share a CMR between two different CMR pairs corresponding to two different NCJT hypothesis. For example, referring to FIG. 2, the UE 215 may be capable of sharing CMR0 between a first NCJT hypothesis associated with TRP 205-a and TRP 205-b and a second NCJT hypothesis associated with TRP 205-a and another TRP other than TRP 205-b.

In some examples, the UE 315 may determine a third CMR sharing capability of the UE 315. The third CMR sharing capability may be a capability of the UE 315 to share a CMR between N hypotheses (e.g., NCJT hypotheses or sTRP hypotheses). Put another way, the UE 315 may determine a quantity of hypotheses (N) between which the UE 315 supports CMR sharing.

At 325, the UE 315 may transmit to the base station 305 an indication of one or more CMR sharing capabilities supported by the UE 315. One or more of the CMR sharing capabilities may be per band (e.g., be applicable to a particular frequency range, such as FR2).

At 327, the base station 305 may determine or configure one or more CSI report configurations for the UE 315. The base station 305 may configure the CSI report configuration(s) based on the CMR sharing capabilities of the UE 315. For example, if the UE 315 supports CMR sharing, then each individual CMR in any of the two CMR groups within a CSI-RS resource set of a CSI report configuration may be used for an sTRP hypothesis (even if the CMR is also configured as a CMR pair for an NCJT hypothesis). If the UE 315 does not support CMR sharing, then the CMRs that appear in a configured CMR pair (corresponding to an NCJT hypothesis) may not be used for respective sTRP hypotheses.

At 330, the base station 305 may transmit one or more CSI report configuration messages to the UE 315. The CSI report configuration messages may indicate one or more CSI report configurations and thus may indicate one or more CMR pairs corresponding to respective NCJT hypotheses. For example, the base station 305 may transmit a CSI report configuration message that indicates a pair of CMRs for an NCJT hypothesis. The pair of CMRs may include a first CMR (e.g., CMR0) and a second CMR (e.g., CMR1).

At 333, the base station 305 may transmit to the UE 315 a CMR sharing configuration message. The CMR sharing configuration message may be based on the CMR sharing capabilities of the UE 315. The CMR sharing configuration message may enable or disable CMR sharing an individual CMR basis, on a CMR pair basis, or on a CSI report configuration basis.

For example, if the UE 315 supports CMR sharing, a first alternative (Alt. 1) may be implemented in which the network (e.g., the base station 305) enables sTRP hypotheses for individual CMRs in any of the two CMR groups (e.g., the base station 305 may configure which of the individual CMRs in any of the two CMR groups correspond to an sTRP hypothesis). Put another way, the base station 305 may enable sTRP hypotheses for CMR sharing on a CMR basis.

Alternatively, a second alternative (Alt. 2) may be implemented in which the network (e.g., the base station 305) enables or disables sTRP hypotheses for all active CMRs indicated by the CSI report configuration. For example, in a first option for Alt. 2, the base station 305 may enable sTRP hypotheses for each individual CMR (e.g., each individual CMR may be associated with an sTRP hypothesis). The base station 305 may implement the first option for Alt 2. via a flag (e.g., one or more bits) included in the CMR sharing configuration message. In a second option for Alt. 2, the base station 305 may enable sTRP hypotheses for none of the active CMRs indicated by the CSI report configuration (e.g., no CMR may be associated with an sTRP hypothesis). The base station 305 may implement the second option for Alt 2. via a flag included in the CMR sharing configuration message. In a third option for Alt. 2, the base station 305 may enable or disable sTRP hypotheses for CMRs on a pair-basis (e.g., the second option for Alt. 2 may be applied to all individual CMRs or to the individual CMRs that appear in a CMR pair).

As an alternative to Alt. 1 and Alt. 2 (Alt. 3), sTRP hypotheses may be enabled for CMRs as a default (if the UE 315 supports CMR sharing). For example, the individual CMRs in any of the two CMR groups configured for the UE 315 may automatically correspond to respective sTRP hypotheses. The sTRP hypothesis corresponding to a CMR in a CMR pair may be associated with the TCI state of the CMR. It should be appreciated that the network may configure NCJT hypotheses individually by configuring pairings but may not configure sTRP hypotheses individually. For example, once two CMR groups {CMR0, CMR1, CMR2} and {CMR3, CMR4, CMR5} are configured (e.g., by a CSI report configuration message), six sTRP hypotheses may automatically exist (as a default) but NCJT hypotheses may be configured by pairing. If Alt. 3 is implemented, a CMR sharing configuration message may not be transmitted at 333.

Although described with reference to sTRP enablement, the described alternatives (e.g., Alt. 1, Alt. 2, Alt. 3) may be used to disable sTRP hypotheses for CMRs.

At 335, the UE 315 may determine a CRP occupation sharing capability of the UE 315. The UE 315 may determine the CRP occupation sharing capability of the UE 315 based on the CMR sharing capability, based on the CSI report configuration message, and/or based on the CMR sharing configuration message.

In some examples, the CRP occupation sharing capability of the UE 315 may be based on (e.g., conditioned on) both hypotheses (e.g., the hypotheses sharing a CMR) being configured with the same resource for interference measurements (e.g., a same CSI-IM and/or a same NZP-IMR). In some examples, the CRP occupation sharing capability of the UE 315 may be applicable within a same CSI report configuration (but not applicable across different CSI report configurations). In some examples, the CRP occupation sharing capability of the UE 315 may be configured by the base station 305 (e.g., via radio resource control (RRC) signaling). For example, the base station 305 may activate, deactivate, and/or configure the CRP occupation sharing capability of the UE 315. Because CSI accuracy may be impacted by CRP sharing (e.g., joint PMI/rank determination may not be possible for NCJT hypotheses), the base station 305 may choose between CSI accuracy and reduced CRP sharing (e.g., fewer resources, CPUs, and/or ports shared between hypothesis).

In some examples, the UE 315 may determine the CRP occupation sharing capability based on the PMI calculation technique used by the UE 315 for determining PMIs associated with NCJT hypotheses. For example, given an NCJT hypothesis corresponding to a CMR pair (CMR0, CMR1), the UE 315 may determine a first PMI and a second PMI for the NCJT hypothesis based on the CMR pair. If the UE 315 separately determines the first PMI and the second PMI, the UE 315 may support CRP sharing (e.g., computation may be shared). If the UE 315 sequentially determines the first PMI and the second PMI (e.g., if the UE 315 initially determines the first PMI then determines the second PMI based on the first PMI), the UE 315 may support partial CRP sharing (e.g., computation may be partially shared such that at least one active resource, CPU, and/or active port is shared). If the UE 315 jointly determines the first PMI and the second PMI, the UE 315 may not support CRP sharing (e.g., computation may not be shared).

At 340, the UE 315 may transmit to the base station 305 an indication of the CRP occupation sharing capability of the UE 315. The CRP sharing capability of the UE 315 may be per band (e.g., applicable to a particular frequency range, such as FR2).

If the UE 315 is able to share both CMRs corresponding to an NCJT hypothesis with respective sTRP hypotheses, the UE 315 may indicate which CMR supports CRP sharing. For example, although the UE 315 may be able to share a pair of CMRs (CMR0, CMR1) between an NCJT hypothesis and sTRP hypotheses, the UE 315 may only support CRP sharing for CMR0. In such an example, the UE 315 may indicate that the UE 315 supports CRP sharing for CMRR0 but not CMR1.

If a CMR appears in multiple CMR pairs (e.g., if a CMR corresponds to multiple NCJT hypotheses), the UE 315 may indicate whether CRP sharing can occur between the NCJT hypotheses. For example, consider a scenario in which CMR0 is shared between a first CMR pair (CMR0, CMR1) and a second CMR pair (CMR0, CMR2) and each CMR occupies two CPUs and four ports. In such a scenario, the UE 315 may indicate that CRP sharing is supported between the two NCJT hypotheses. Accordingly, the UE 315 may determine $O_{RES}$ by counting three active resources (instead of four), determine $O_{CPU}$ by counting three occupied CPUs (instead of four), and determine $O_{PORT}$ by counting 12 active ports (instead of 16).

In some examples, the UE 315 may indicate N', which may be the quantity of times the active resources, occupied CPUs, and active ports associated with a CMR may be counted towards $O_{RES}$, $O_{CPU}$, and $O_{PORT}$. The quantity N' may be less than the quantity N, which may be the quantity of NCJT hypotheses that refer to the CMR. There may be multiple pairs of {N', N} and each pair of {N', N} may be based on the capabilities of the UE 315, based on a configuration by the network, and/or pre-configured or pre-defined at the UE 315 (e.g., according to a technical standard).

At 345, the base station 305 may transmit one or more CSI report configuration messages to the UE 315. The CSI report configuration message(s) may be based on the CRP occupation sharing capability of the UE 315 and may indicate or update one or more CSI report configurations for the UE 315. For example, the base station 305 may configure the UE 315 with CSI report configurations such that $O_{RES}$, $O_{CPU}$, and $O_{PORT}$ do not exceed $N_{RES}$, $N_{CPU}$, and $N_{PORT}$, respectively.

At 350, the UE 315 may determine transmission hypotheses corresponding to CMRs configured by the CSI report configuration message(s). For example, the UE 315 may determine that both an sTRP and an NCJT hypothesis correspond to a CMR. As another example, the UE 315 may determine that multiple NCJT hypotheses correspond to a CMR. The UE 315 may determine the transmission hypotheses corresponding to a CMR based on the CSI report configuration message, based on the CMR sharing configuration message, and/or based on a default configuration.

At 355, the UE 315 may measure a CSI-RS in the first CMR (e.g., CMR0) corresponding to the NCJT hypothesis. At 360, the UE 315 may measure a CSI-RS in the second CMR (e.g., CMR1) corresponding to the NCJT hypothesis. Thus, the UE 315 may perform channel measurements using the first CMR and the second CMR.

At 365, the UE 315 may generate CSI for the NCJT hypothesis based on the channel measurements from the first CMR and the second CMR. In some examples, the CSI may include one or more PMIs for the NCSJ hypothesis. The UE 315 may also generate CSI for one or more sTRP hypotheses at 370. For example, the UE 315 may generate CSI for an sTRP hypothesis enabled for the first CMR (e.g., CMR0). Additionally or alternatively, the UE 315 may generate CSI for an sTRP hypothesis enabled for the second CMR (e.g., CMR1). The CSI for an sTRP hypothesis may include the PMI for that sTRP hypothesis. Thus, the CSI for an sTRP hypothesis may be based on the CMR shared with the NCJT hypothesis.

At 370, the UE 315 may transmit, and the base station 305 may receive, a CSI report for the NCJT hypothesis (e.g., if the UE 315 is configured with CSI reporting Option 1 or Option 2). The CSI report may include PMI calculated for the NCJT hypothesis at 365. At 375, the UE 315 may transmit, and the base station 305 may receive, a CSI report for an sTRP hypothesis (e.g., if the UE 315 is configured with CSI reporting Option 1 where X=1 or X=2). The CSI report for the sTRP hypothesis may include PMI calculated for the sTRP hypothesis at 365.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 4:
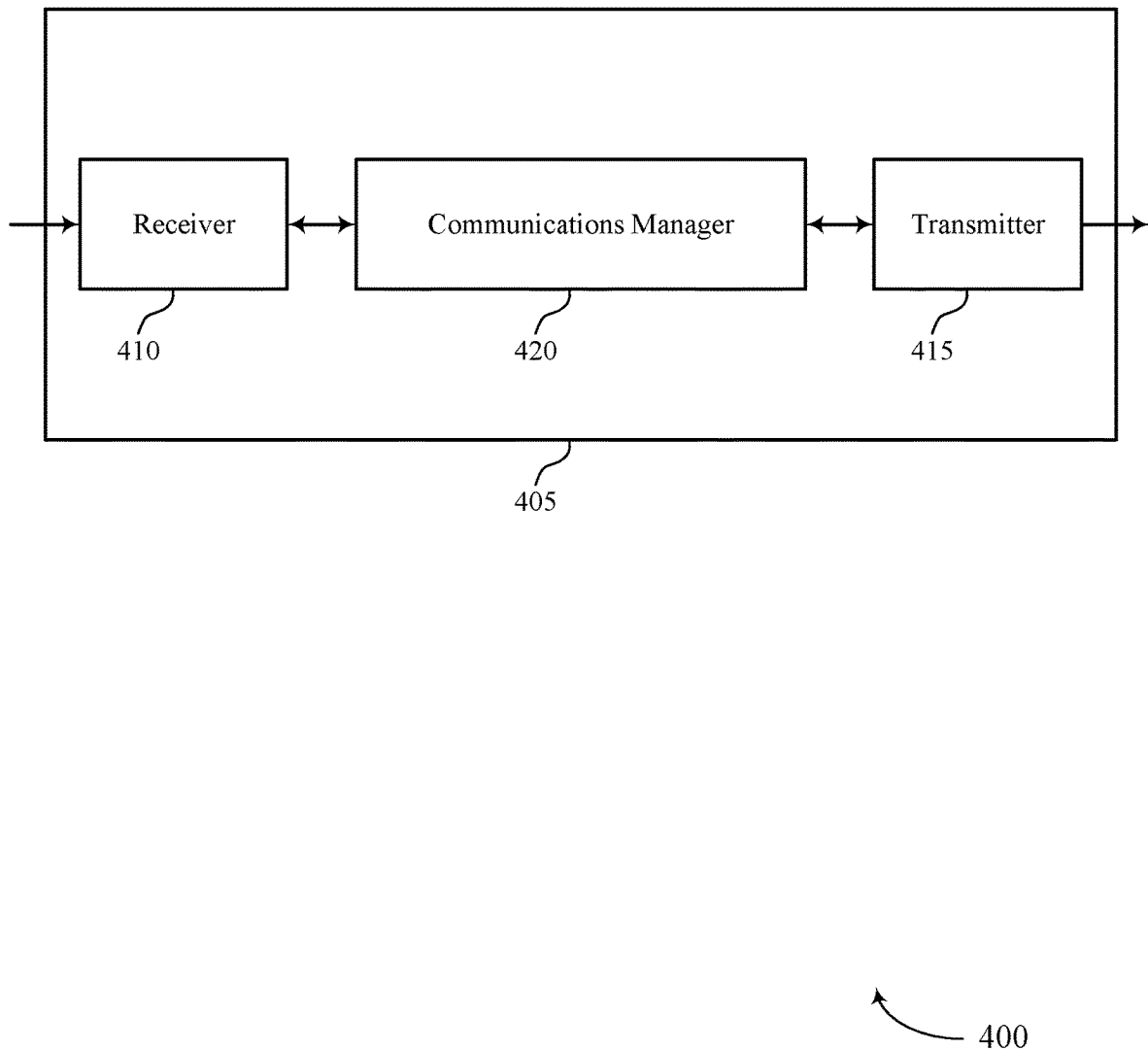
FIGS. 4 and 5 show block diagrams of devices that support resource sharing between transmission hypotheses in accordance with aspects of the present disclosure.

FIG. 4 shows a block diagram 400 of a device 405 that supports resource sharing between transmission hypotheses in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to resource sharing between transmission hypotheses). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to resource sharing between transmission hypotheses). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of resource sharing between transmission hypotheses as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for indicating, to a base station, a capability of the UE to use a channel measurement resource for both a joint transmission hypothesis and a single transmission hypothesis. The communications manager 420 may be configured as or otherwise support a means for receiving, based on indicating the capability of the UE, a configuration message indicating a first channel measurement resource that is associated with a first transmission configuration indicator state and that is configured for a first joint transmission hypothesis. The communications manager 420 may be configured as or otherwise support a means for obtaining a channel measurement for both the first joint transmission hypothesis and a first single transmission hypothesis using the first channel measurement resource based on the configuration message.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources and UE resources.

Figure 5:
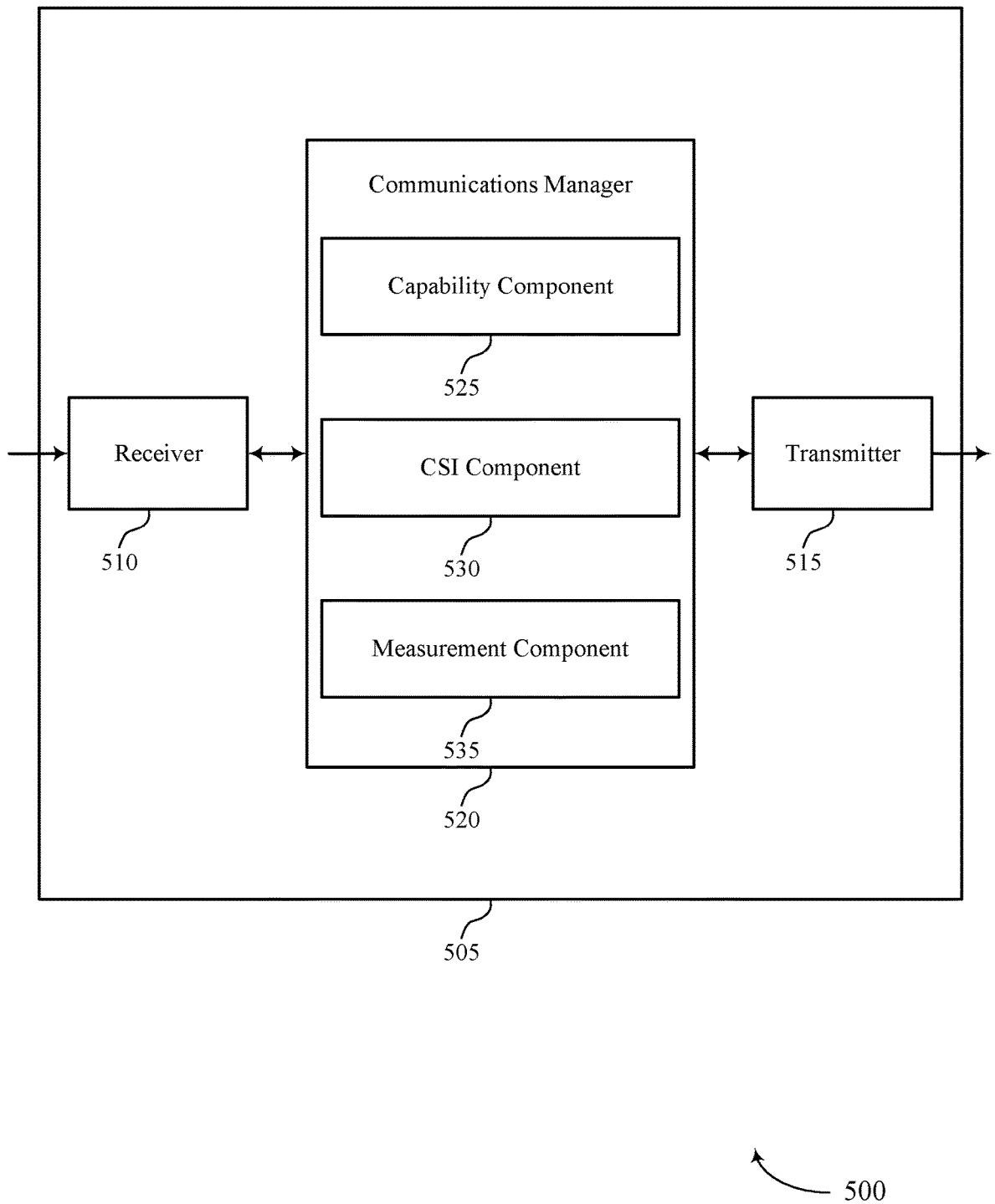

FIG. 5 shows a block diagram 500 of a device 505 that supports resource sharing between transmission hypotheses in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource sharing between transmission hypotheses). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource sharing between transmission hypotheses). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of resource sharing between transmission hypotheses as described herein. For example, the communications manager 520 may include a capability component 525, a CSI component 530, a measurement component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The capability component 525 may be configured as or otherwise support a means for indicating, to a base station, a capability of the UE to use a channel measurement resource for both a joint transmission hypothesis and a single transmission hypothesis. The CSI component 530 may be configured as or otherwise support a means for receiving, based on indicating the capability of the UE, a configuration message indicating a first channel measurement resource that is associated with a first transmission configuration indicator state and that is configured for a first joint transmission hypothesis. The measurement component 535 may be configured as or otherwise support a means for obtaining a channel measurement for both the first joint transmission hypothesis and a first single transmission hypothesis using the first channel measurement resource based on the configuration message.

Figure 6:
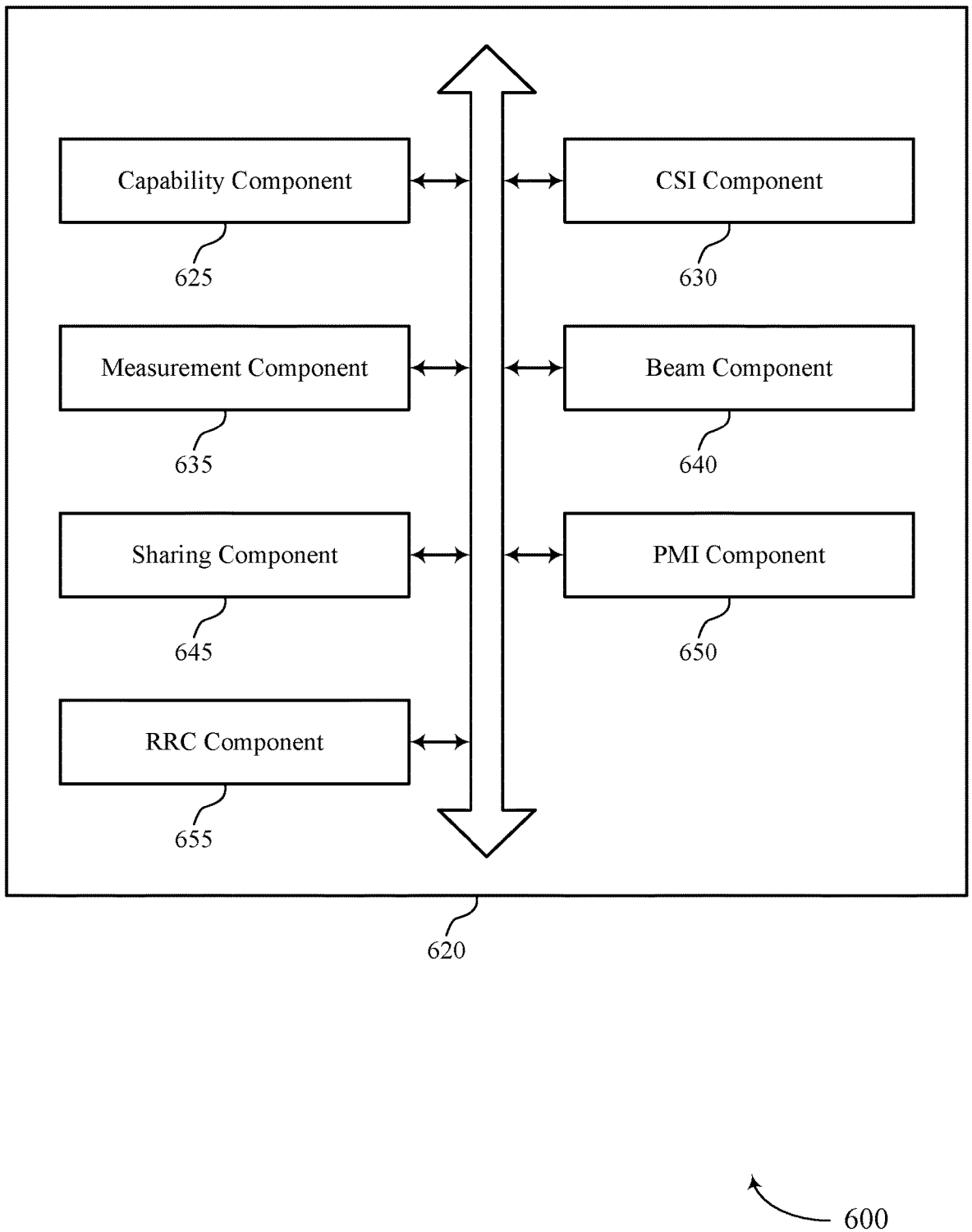
FIG. 6 shows a block diagram of a communications manager that supports resource sharing between transmission hypotheses in accordance with aspects of the present disclosure.

FIG. 6 shows a block diagram 600 of a communications manager 620 that supports resource sharing between transmission hypotheses in accordance with aspects of the present disclosure. The communications manager 620 may be an example of aspects of a communications manager 420, a communications manager 520, or both, as described herein. The communications manager 620, or various components thereof, may be an example of means for performing various aspects of resource sharing between transmission hypotheses as described herein. For example, the communications manager 620 may include a capability component 625, a CSI component 630, a measurement component 635, a beam component 640, a sharing component 645, a PMI component 650, an RRC component 655, or any combination thereof. Each of these components may communicate, directly or indirectly, with one another (e.g., via one or more buses).

The communications manager 620 may support wireless communication at a UE in accordance with examples as disclosed herein. The capability component 625 may be configured as or otherwise support a means for indicating, to a base station, a capability of the UE to use a channel measurement resource for both a joint transmission hypothesis and a single transmission hypothesis. The CSI component 630 may be configured as or otherwise support a means for receiving, based on indicating the capability of the UE, a configuration message indicating a first channel measurement resource that is associated with a first transmission configuration indicator state and that is configured for a first joint transmission hypothesis. The measurement component 635 may be configured as or otherwise support a means for obtaining a channel measurement for both the first joint transmission hypothesis and a first single transmission hypothesis using the first channel measurement resource based on the configuration message.

In some examples, the CSI component 630 may be configured as or otherwise support a means for transmitting, to the base station, a channel state information report for the first joint transmission hypothesis or for the first single transmission hypothesis, the channel state information report based on the channel measurement obtained using the first channel measurement resource.

In some examples, the beam component 640 may be configured as or otherwise support a means for determining that the UE supports simultaneous multi-beam reception. In some examples, the capability component 625 may be configured as or otherwise support a means for determining the capability of the UE based on the UE supporting simultaneous multi-beam reception.

In some examples, the configuration message indicates plurality of channel measurement resources including the first channel measurement resource. In some examples, the CSI component 630 may be configured as or otherwise support a means for receiving a second configuration message that enables single transmission hypotheses for the plurality of channel measurement resources on an individual basis.

In some examples, the configuration message indicates a plurality of channel measurement resources including the first channel measurement resource. In some examples, the CSI component 630 may be configured as or otherwise support a means for receiving a second configuration message comprising a flag that enables single transmission hypotheses for each channel measurement resource in the plurality of channel measurement resources.

In some examples, the configuration message indicates plurality of pairs of channel measurement resources corresponding to respective joint transmission hypotheses. In some examples, the CSI component 630 may be configured as or otherwise support a means for receiving a second configuration message that disables single transmission hypotheses for one or more pairs of the plurality of pairs.

In some examples, the capability component 625 may be configured as or otherwise support a means for determining, based on the capability of the UE and a default configuration, that the first channel measurement resource corresponds to the first single transmission hypothesis.

In some examples, the capability applies to a frequency range supported by the UE. In some examples, the capability component 625 may be configured as or otherwise support a means for determining the capability of the UE based on a channel state information reporting capability of the UE.

In some examples, the capability component 625 may be configured as or otherwise support a means for indicating a second capability of the UE to use a channel measurement resource for multiple joint transmission hypotheses.

In some examples, the capability component 625 may be configured as or otherwise support a means for indicating a quantity transmission hypotheses for which the UE is capable of using a channel measurement resource.

In some examples, the sharing component 645 may be configured as or otherwise support a means for indicating, to the base station based on the capability of the UE, a second capability of the UE to share at least one of processing unit occupation, resource occupation, or port occupation between the first joint transmission hypothesis and the first single transmission hypothesis.

In some examples, the sharing component 645 may be configured as or otherwise support a means for determining the second capability of the UE based on the first joint transmission hypothesis and the first single transmission hypothesis being configured with the same resources for interference measurements.

In some examples, the sharing component 645 may be configured as or otherwise support a means for determining the second capability of the UE based on a technique used by the UE to determine a first PMI for the first joint transmission hypothesis and a second PMI for the first joint transmission hypothesis.

In some examples, the PMI component 650 may be configured as or otherwise support a means for separately determining a first PMI for the first joint transmission hypothesis and a second PMI for the first joint transmission hypothesis, where the second capability of the UE is based on separately determining the first PMI and the second PMI.

In some examples, the PMI component 650 may be configured as or otherwise support a means for determining a first PMI for the first joint transmission hypothesis based on a second PMI for the first joint transmission hypothesis, where the second capability of the UE is based on determining the first PMI based on the second PMI.

In some examples, the PMI component 650 may be configured as or otherwise support a means for jointly determining a first PMI for the first joint transmission hypothesis and a second PMI for the first joint transmission hypothesis, where the second capability of the UE is based on jointly determining the first PMI and the second PMI.

In some examples, the sharing component 645 may be configured as or otherwise support a means for determining, based on the configuration message, a second channel measurement resource configured for the first joint transmission hypothesis and a second single transmission hypothesis, where the second capability applies to the first channel measurement resource or the second channel measurement resource.

In some examples, the RRC component 655 may be configured as or otherwise support a means for receiving RRC signaling that enables or disables the second capability of the UE.

In some examples, the sharing component 645 may be configured as or otherwise support a means for determining, based on the configuration message, that the first channel measurement resource is configured for a second joint transmission hypothesis. In some examples, the capability component 625 may be configured as or otherwise support a means for indicating, to the base station, a second capability of the UE to share at least one of processing unit occupation, resource occupation, or port occupation between the first joint transmission hypothesis and the second joint transmission hypothesis.

Figure 7:
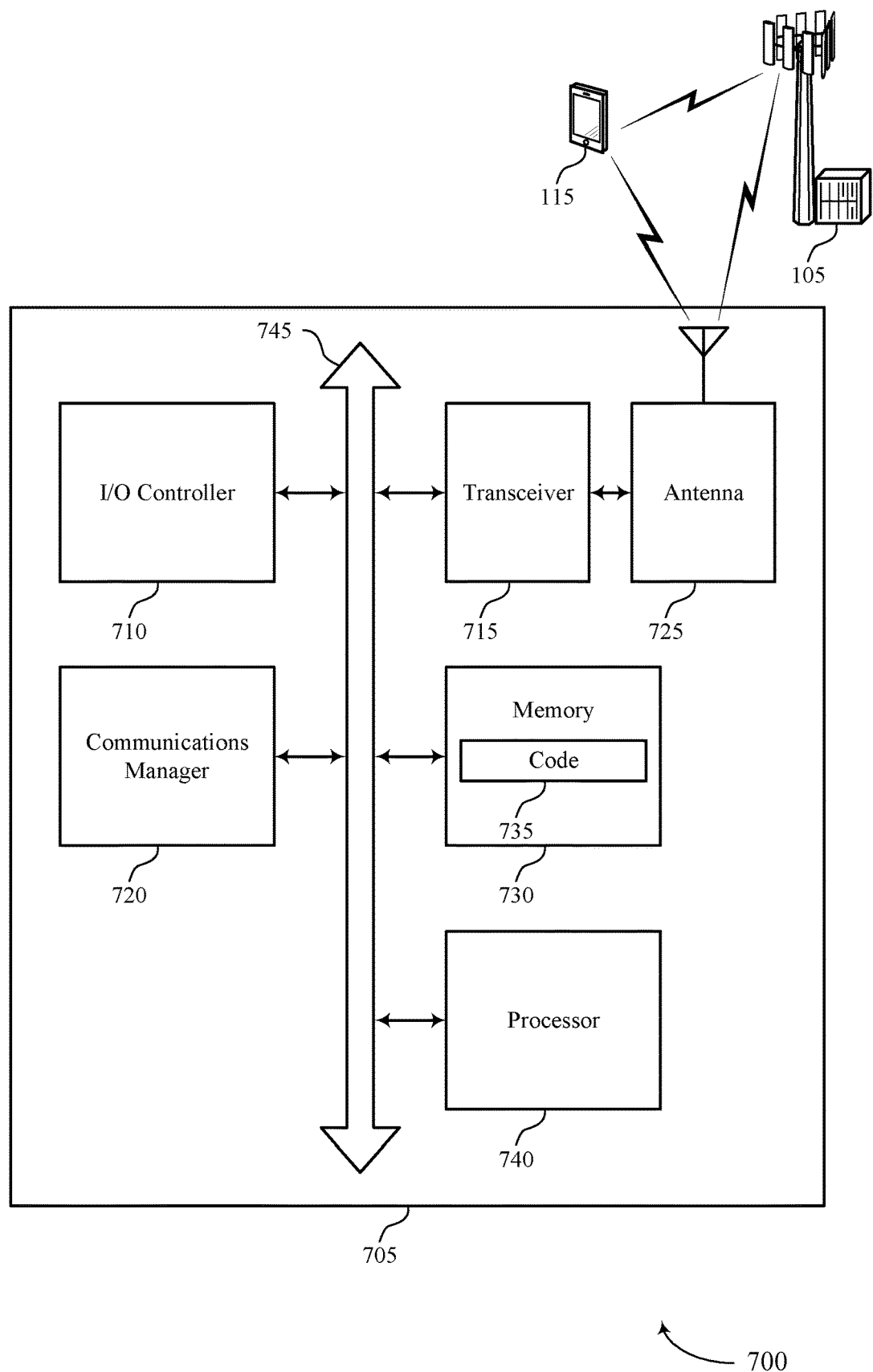
FIG. 7 shows a diagram of a system including a device that supports resource sharing between transmission hypotheses in accordance with aspects of the present disclosure.

FIG. 7 shows a diagram of a system 700 including a device 705 that supports resource sharing between transmission hypotheses in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting resource sharing between transmission hypotheses). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for indicating, to a base station, a capability of the UE to use a channel measurement resource for both a joint transmission hypothesis and a single transmission hypothesis. The communications manager 720 may be configured as or otherwise support a means for receiving, based on indicating the capability of the UE, a configuration message indicating a first channel measurement resource that is associated with a first transmission configuration indicator state and that is configured for a first joint transmission hypothesis. The communications manager 720 may be configured as or otherwise support a means for obtaining a channel measurement for both the first joint transmission hypothesis and a first single transmission hypothesis using the first channel measurement resource based on the configuration message.

By including or configuring the communications manager 720 in accordance with examples as described herein, the device 705 may support techniques for more efficient utilization of communication resources and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of resource sharing between transmission hypotheses as described herein, or the processor 740 and the memory 730 may be otherwise configured to perform or support such operations.

Figure 8:
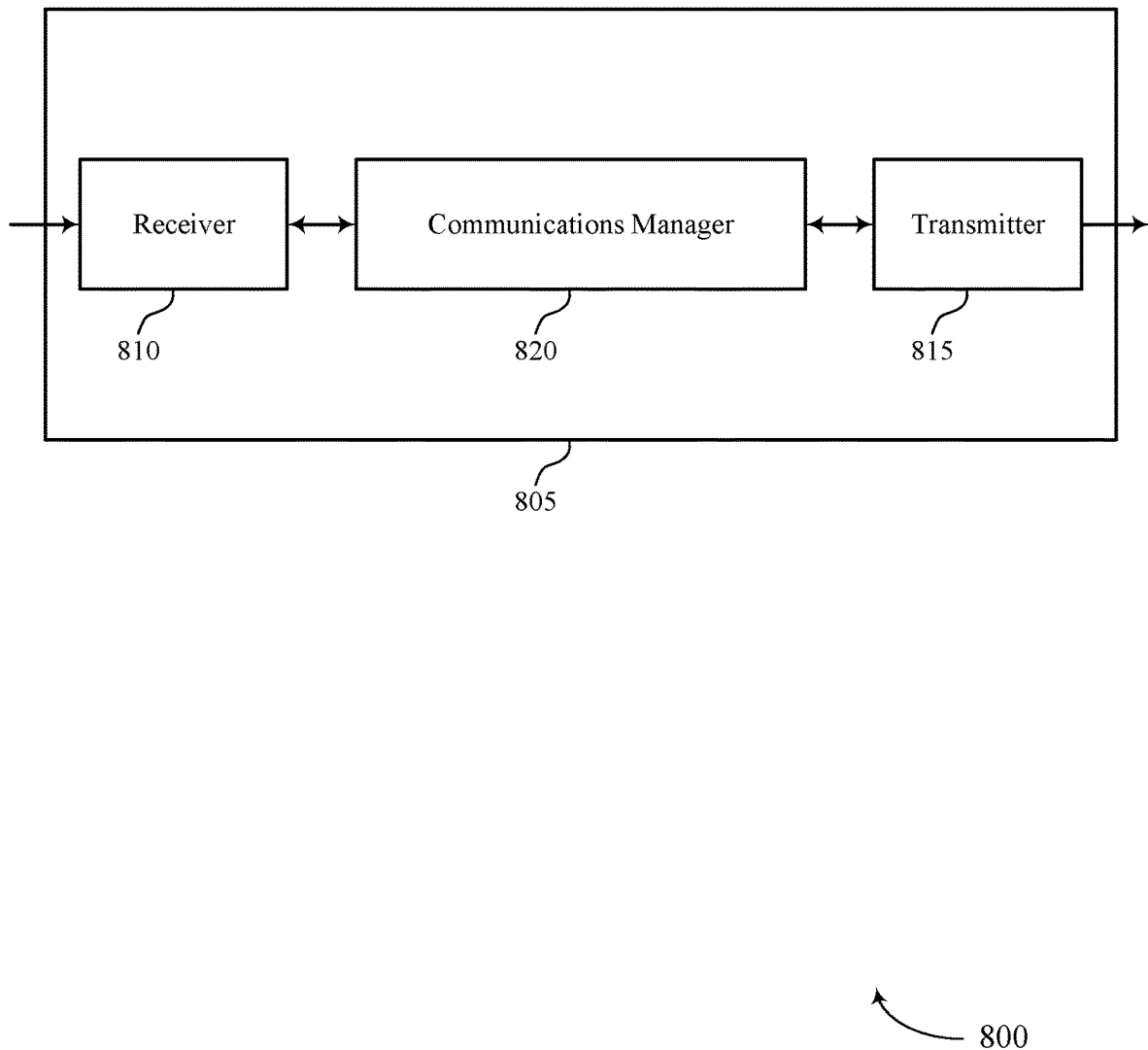
FIGS. 8 and 9 show block diagrams of devices that support resource sharing between transmission hypotheses in accordance with aspects of the present disclosure.

FIG. 8 shows a block diagram 800 of a device 805 that supports resource sharing between transmission hypotheses in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resource sharing between transmission hypotheses). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource sharing between transmission hypotheses). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of resource sharing between transmission hypotheses as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving an indication of a capability of a UE to use a channel measurement resource for both a joint transmission hypothesis and a single transmission hypothesis. The communications manager 820 may be configured as or otherwise support a means for indicating, to the UE, a first channel measurement resource that is associated with a first transmission configuration indicator state, where the first channel measurement resource is configured for a first joint transmission hypothesis and a first single transmission hypothesis based on the capability of the UE.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources and UE resources.

Figure 9:
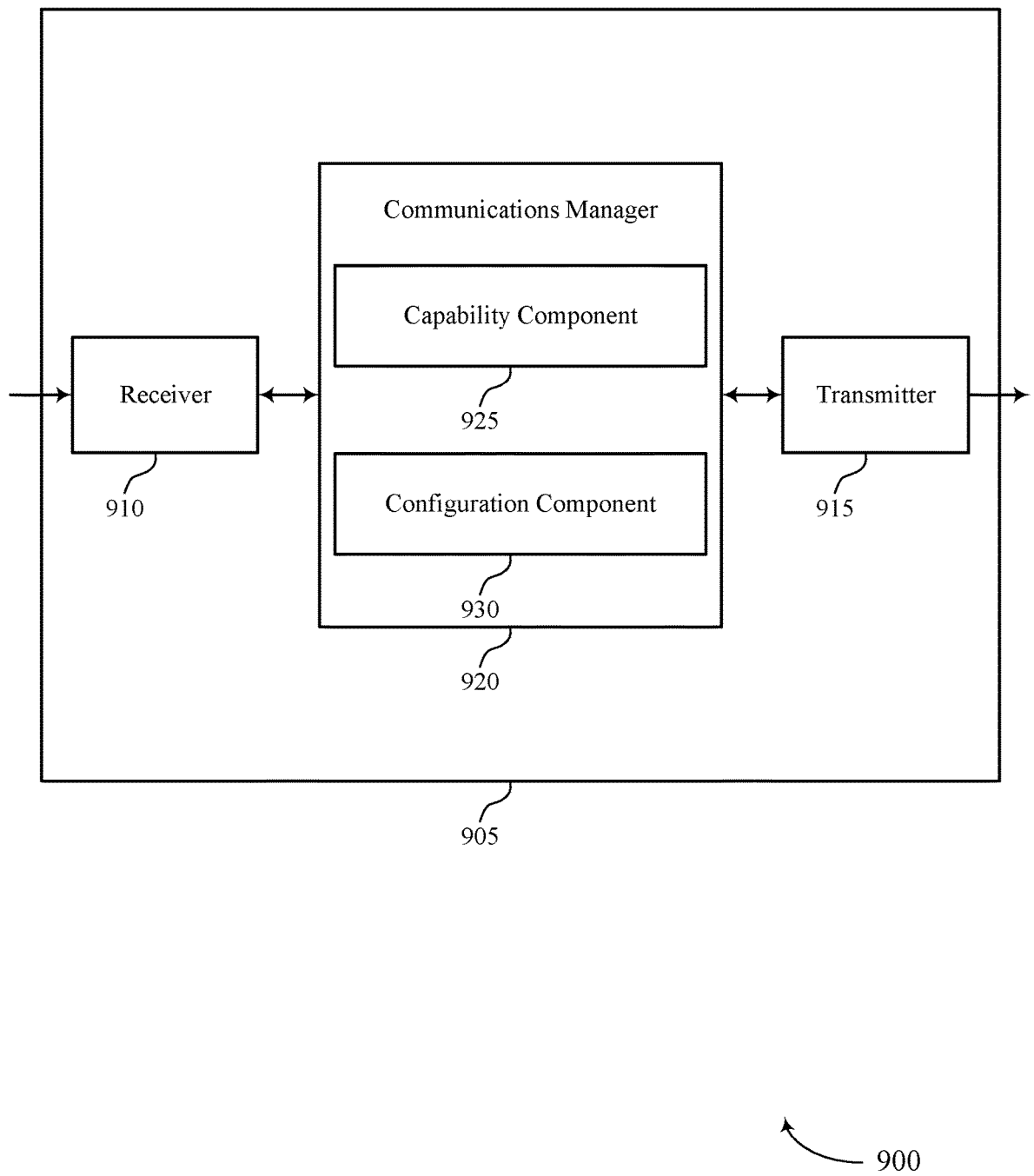

FIG. 9 shows a block diagram 900 of a device 905 that supports resource sharing between transmission hypotheses in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to resource sharing between transmission hypotheses). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resource sharing between transmission hypotheses). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of resource sharing between transmission hypotheses as described herein. For example, the communications manager 920 may include a capability component 925 a configuration component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The capability component 925 may be configured as or otherwise support a means for receiving an indication of a capability of a UE to use a channel measurement resource for both a joint transmission hypothesis and a single transmission hypothesis. The configuration component 930 may be configured as or otherwise support a means for indicating, to the UE, a first channel measurement resource that is associated with a first transmission configuration indicator state, where the first channel measurement resource is configured for a first joint transmission hypothesis and a first single transmission hypothesis based on the capability of the UE.

Figure 10:
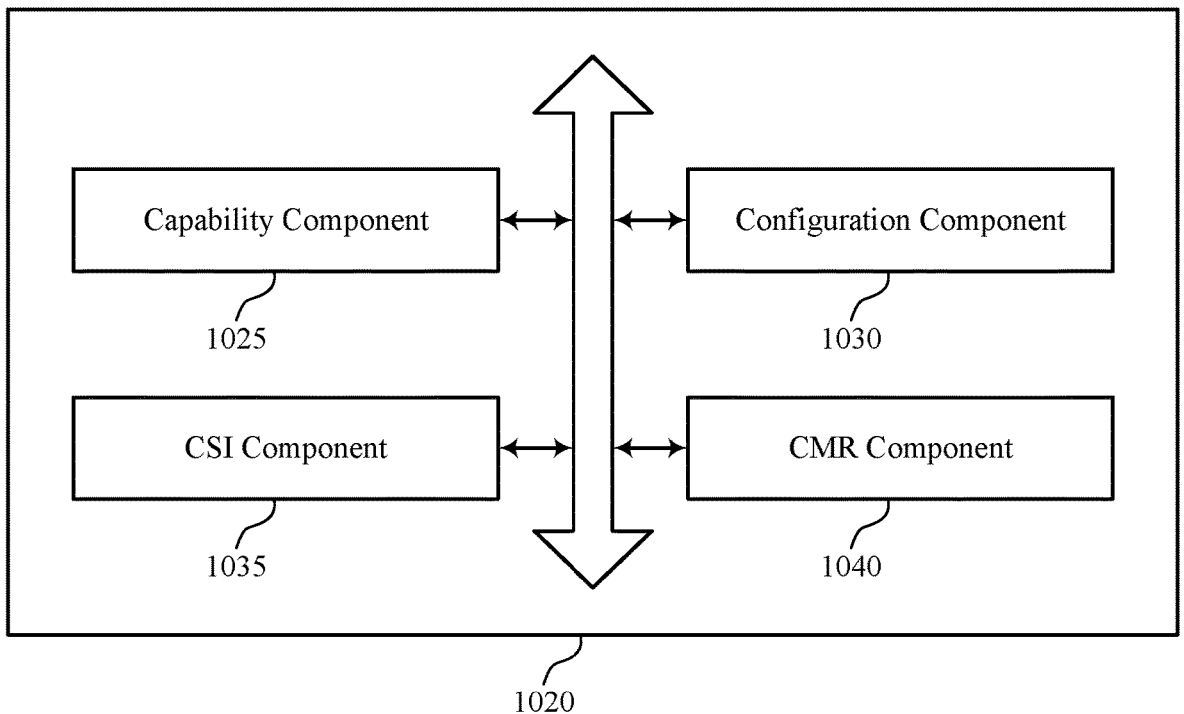
FIG. 10 shows a block diagram of a communications manager that supports resource sharing between transmission hypotheses in accordance with aspects of the present disclosure.

FIG. 10 shows a block diagram 1000 of a communications manager 1020 that supports resource sharing between transmission hypotheses in accordance with aspects of the present disclosure. The communications manager 1020 may be an example of aspects of a communications manager 820, a communications manager 920, or both, as described herein. The communications manager 1020, or various components thereof, may be an example of means for performing various aspects of resource sharing between transmission hypotheses as described herein. For example, the communications manager 1020 may include a capability component 1025, a configuration component 1030, a CSI component 1035, an CMR component 1040, or any combination thereof. Each of these components may communicate, directly or indirectly, with one another (e.g., via one or more buses).

The communications manager 1020 may support wireless communication at a base station in accordance with examples as disclosed herein. The capability component 1025 may be configured as or otherwise support a means for receiving an indication of a capability of a UE to use a channel measurement resource for both a joint transmission hypothesis and a single transmission hypothesis. The configuration component 1030 may be configured as or otherwise support a means for indicating, to the UE, a first channel measurement resource that is associated with a first transmission configuration indicator state, where the first channel measurement resource is configured for a first joint transmission hypothesis and a first single transmission hypothesis based on the capability of the UE.

In some examples, the CSI component 1035 may be configured as or otherwise support a means for receiving a channel state information report for the first joint transmission hypothesis or for the first single transmission hypothesis, the channel state information report based on a channel measurement obtained using the first channel measurement resource.

In some examples, a first configuration message indicates a plurality of channel measurement resources including the first channel measurement resource. In some examples, the CSI component 1035 may be configured as or otherwise support a means for transmitting a second configuration message that enables single transmission hypotheses for the plurality of channel measurement resources on an individual basis.

In some examples, a configuration message indicates a plurality of channel measurement resources including the first channel measurement resource. In some examples, the CSI component 1035 may be configured as or otherwise support a means for transmitting a second configuration message comprising a flag that enables single transmission hypotheses for each channel measurement resource in the plurality of channel measurement resources.

In some examples, a configuration message indicates a plurality of pairs of channel measurement resources corresponding to respective joint transmission hypotheses. In some examples, the CSI component 1035 may be configured as or otherwise support a means for transmitting a second configuration message that disables single transmission hypotheses for one or more pairs of the plurality of pairs.

In some examples, the capability component 1025 may be configured as or otherwise support a means for receiving an indication of a second capability of the UE to use a channel measurement resource for multiple joint transmission hypotheses. In some examples, the CMR component 1040 may be configured as or otherwise support a means for configuring the first channel measurement resource for a second joint transmission hypothesis based on the second capability of the UE.

In some examples, the capability component 1025 may be configured as or otherwise support a means for receiving an indication of a quantity of transmission hypotheses for which the UE is capable of using a channel measurement resource. In some examples, the CMR component 1040 may be configured as or otherwise support a means for configuring the first channel measurement resource for a second joint transmission hypothesis or a second single transmission hypothesis based on the quantity of transmission hypotheses.

In some examples, the capability component 1025 may be configured as or otherwise support a means for receiving an indication of a second capability of the UE to share at least one of processing unit occupation, resource occupation, or port occupation between the first joint transmission hypothesis and the first single transmission hypothesis. In some examples, the configuration component 1030 may be configured as or otherwise support a means for configuring the UE with one or more channel state information report configurations based on the second capability.

In some examples, the indication of the second capability indicates the first channel measurement resource.

In some examples, the capability component 1025 may be configured as or otherwise support a means for receiving an indication of a second capability of the UE to share at least one of processing unit occupation, resource occupation, or port occupation between the first joint transmission hypothesis and a second joint transmission hypothesis. In some examples, the configuration component 1030 may be configured as or otherwise support a means for configuring the UE with one or more channel state information report configurations based on the second capability.

Figure 11:
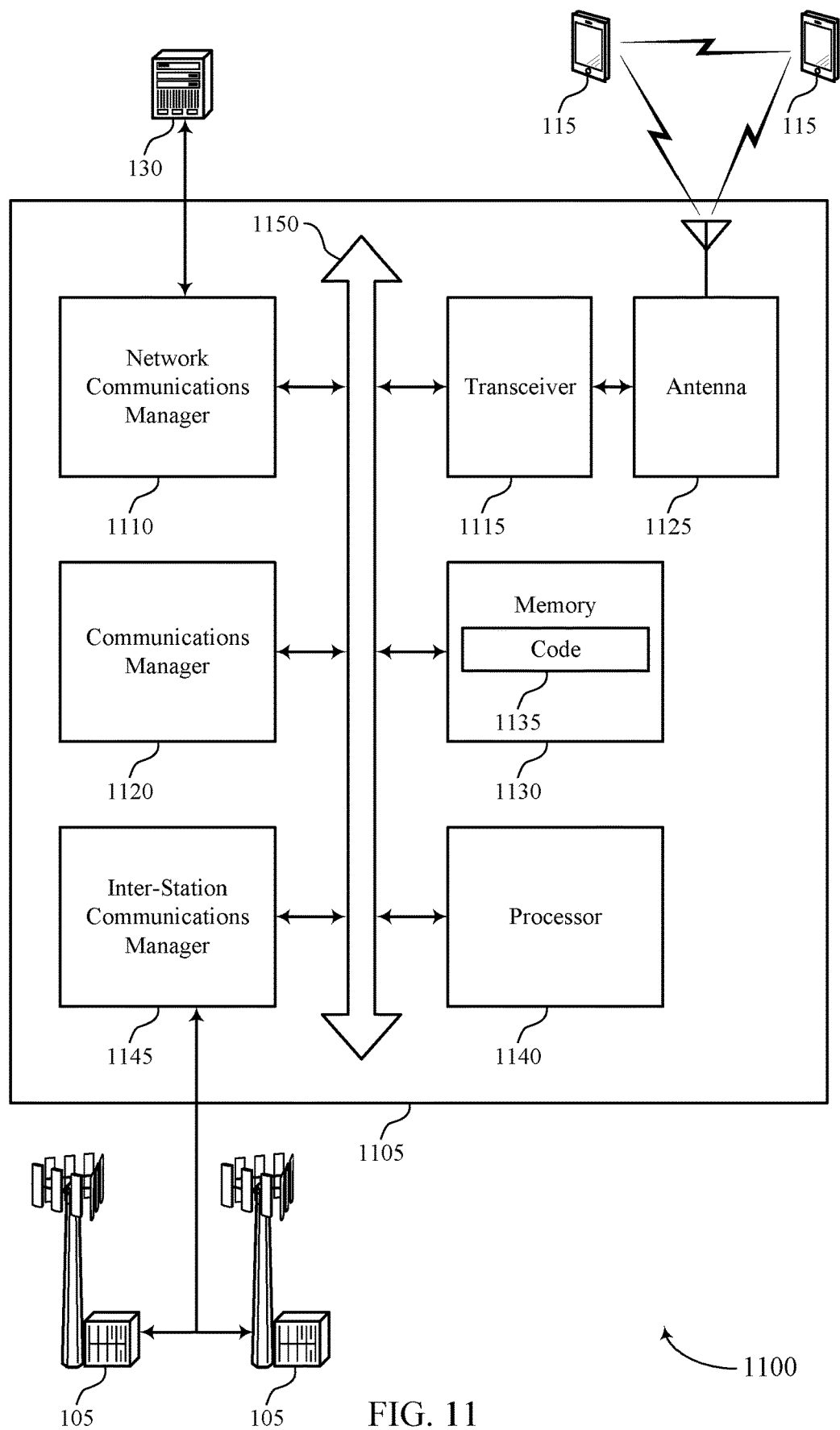
FIG. 11 shows a diagram of a system including a device that supports resource sharing between transmission hypotheses in accordance with aspects of the present disclosure.

FIG. 11 shows a diagram of a system 1100 including a device 1105 that supports resource sharing between transmission hypotheses in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125.

The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resource sharing between transmission hypotheses). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving an indication of a capability of a UE to use a channel measurement resource for both a joint transmission hypothesis and a single transmission hypothesis. The communications manager 1120 may be configured as or otherwise support a means for indicating, to the UE, a first channel measurement resource that is associated with a first transmission configuration indicator state, where the first channel measurement resource is configured for a first joint transmission hypothesis and a first single transmission hypothesis based on the capability of the UE.

By including or configuring the communications manager 1120 in accordance with examples as described herein, the device 1105 may support techniques for more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of resource sharing between transmission hypotheses as described herein, or the processor 1140 and the memory 1130 may be otherwise configured to perform or support such operations.

Figure 12:
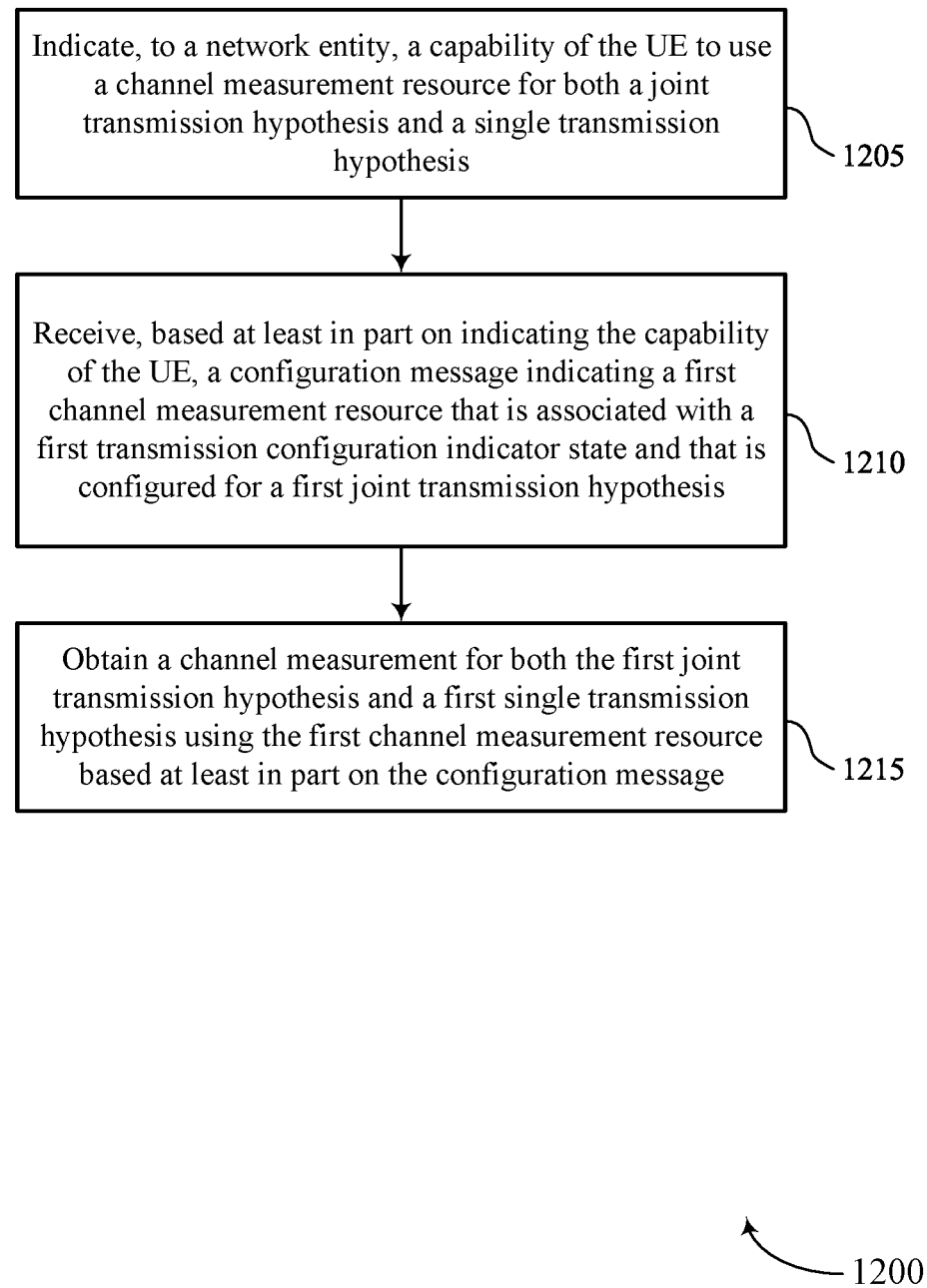
FIGS. 12 and 13 show flowcharts illustrating methods that support resource sharing between transmission hypotheses in accordance with aspects of the present disclosure.

FIG. 12 shows a flowchart illustrating a method 1200 that supports resource sharing between transmission hypotheses in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include indicating, to a base station, a capability of the UE to use a channel measurement resource for both a joint transmission hypothesis and a single transmission hypothesis. The operations of 1205 may be performed in accordance with examples as disclosed herein. In some examples, aspects of the operations of 1205 may be performed by a capability component 625 as described with reference to FIG. 6.

At 1210, the method may include receiving, based on indicating the capability of the UE, a configuration message indicating a first channel measurement resource that is associated with a first transmission configuration indicator state and that is configured for a first joint transmission hypothesis. The operations of 1210 may be performed in accordance with examples as disclosed herein. In some examples, aspects of the operations of 1210 may be performed by a CSI component 630 as described with reference to FIG. 6.

At 1215, the method may include obtaining a channel measurement for both the first joint transmission hypothesis and a first single transmission hypothesis using the first channel measurement resource based on the configuration message. The operations of 1215 may be performed in accordance with examples as disclosed herein. In some examples, aspects of the operations of 1215 may be performed by a measurement component 635 as described with reference to FIG. 6.

Figure 13:
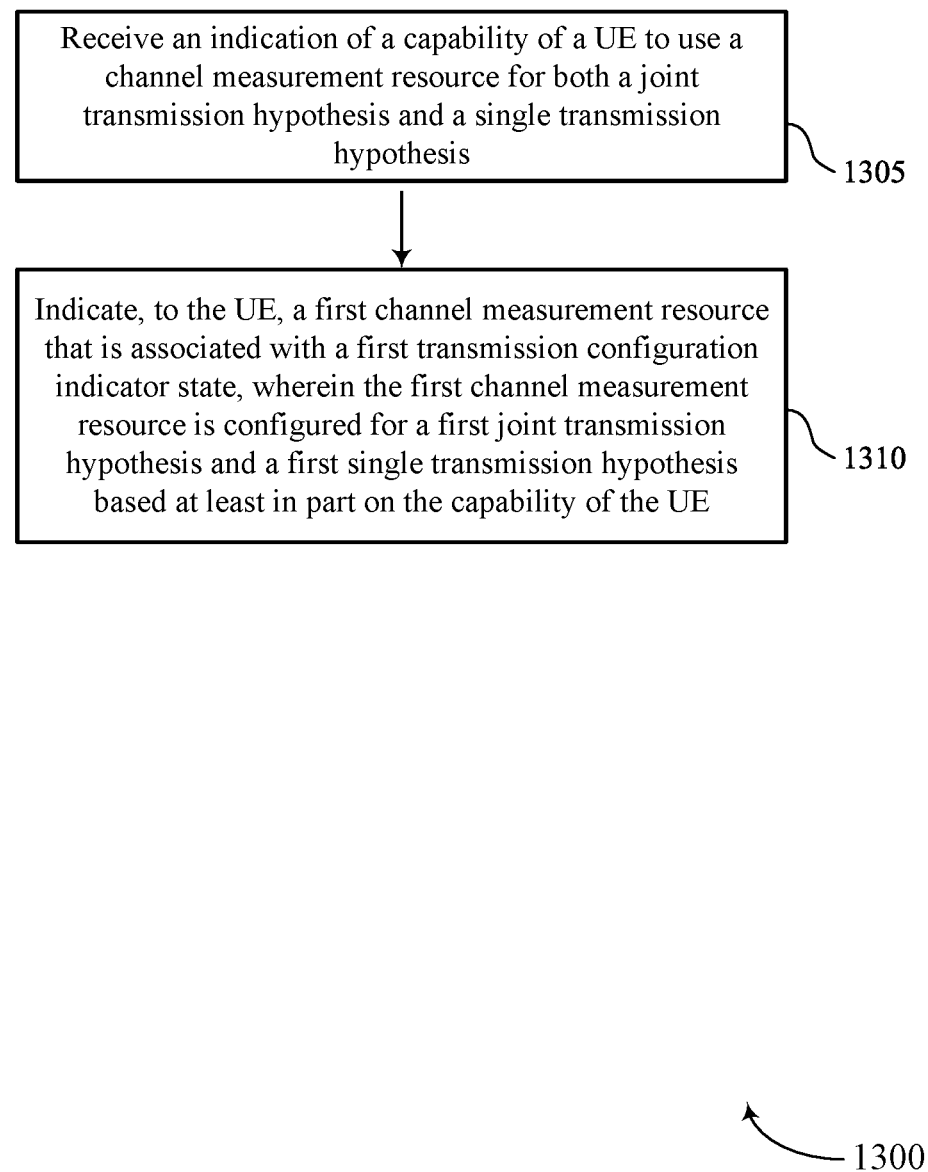

FIG. 13 shows a flowchart illustrating a method 1300 that supports resource sharing between transmission hypotheses in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1305, the method may include receiving an indication of a capability of a UE to use a channel measurement resource for both a joint transmission hypothesis and a single transmission hypothesis. The operations of 1305 may be performed in accordance with examples as disclosed herein. In some examples, aspects of the operations of 1305 may be performed by a capability component 1025 as described with reference to FIG. 10.

At 1310, the method may include indicating, to the UE, a first channel measurement resource that is associated with a first transmission configuration indicator state, where the first channel measurement resource is configured for a first joint transmission hypothesis and a first single transmission hypothesis based on the capability of the UE. The operations of 1310 may be performed in accordance with examples as disclosed herein. In some examples, aspects of the operations of 1310 may be performed by a configuration component 1030 as described with reference to FIG. 10. The signals, indications, messages, or configurations described herein may be conveyed via RRC signaling, via downlink control information (DCI), or via a medium access control (MAC) control element (MAC-CE), among other mechanisms.

The following provides an overview of aspects of the present disclosure:

Aspect 1: A method for wireless communication at a UE, comprising: indicating, to a base station, a capability of the UE to use a channel measurement resource for both a joint transmission hypothesis and a single transmission hypothesis; receiving, based at least in part on indicating the capability of the UE, a configuration message indicating a first channel measurement resource that is associated with a first transmission configuration indicator state and that is configured for a first joint transmission hypothesis; and obtaining a channel measurement for both the first joint transmission hypothesis and a first single transmission hypothesis using the first channel measurement resource based at least in part on the configuration message.

Aspect 2: The method of aspect 1, further comprising: transmitting, to the base station, a channel state information report for the first joint transmission hypothesis or for the first single transmission hypothesis, the channel state information report based at least in part on the channel measurement obtained using the first channel measurement resource.

Aspect 3: The method of any of aspects 1 through 2, further comprising: determining that the UE supports simultaneous multi-beam reception; and determining the capability of the UE based at least in part on the UE supporting simultaneous multi-beam reception.

Aspect 4: The method of any of aspects 1 through 3, wherein the configuration message indicates a plurality of channel measurement resources including the first channel measurement resource, the method further comprising: receiving a second configuration message that enables single transmission hypotheses for the plurality of channel measurement resources on an individual basis.

Aspect 5: The method of any of aspects 1 through 3, wherein the configuration message indicates a plurality of channel measurement resources including the first channel measurement resource, the method further comprising: receiving a second configuration message comprising a flag that enables single transmission hypotheses for each channel measurement resource in the plurality of channel measurement resources.

Aspect 6: The method of any of aspects 1 through 3, wherein the configuration message indicates a plurality of pairs of channel measurement resources corresponding to respective joint transmission hypotheses, the method further comprising: receiving a second configuration message that disables single transmission hypotheses for one or more pairs of the plurality of pairs.

Aspect 7: The method of any of aspects 1 through 3, further comprising: determining, based at least in part on the capability of the UE and a default configuration, that the first channel measurement resource corresponds to the first single transmission hypothesis.

Aspect 8: The method of any of aspects 1 through 7, wherein the capability applies to a frequency range supported by the UE.

Aspect 9: The method of any of aspects 1 through 8, further comprising: determining the capability of the UE based at least in part on a channel state information reporting capability of the UE.

Aspect 10: The method of any of aspects 1 through 9, further comprising: indicating a second capability of the UE to use a channel measurement resource for multiple joint transmission hypotheses.

Aspect 11: The method of any of aspects 1 through 10, further comprising: indicating a quantity transmission hypotheses for which the UE is capable of using a channel measurement resource.

Aspect 12: The method of any of aspects 1 through 11, further comprising: indicating, to the base station based at least in part on the capability of the UE, a second capability of the UE to share at least one of processing unit occupation, resource occupation, or port occupation between the first joint transmission hypothesis and the first single transmission hypothesis.

Aspect 13: The method of aspect 12, further comprising: determining the second capability of the UE based at least in part on the first joint transmission hypothesis and the first single transmission hypothesis being configured with the same resources for interference measurements.

Aspect 14: The method of any of aspects 12 through 13, further comprising: determining the second capability of the UE based at least in part on a technique used by the UE to determine a first PMI for the first joint transmission hypothesis and a second PMI for the first joint transmission hypothesis.

Aspect 15: The method of any of aspects 12 through 14, further comprising: separately determining a first PMI for the first joint transmission hypothesis and a second PMI for the first joint transmission hypothesis, wherein the second capability of the UE is based at least in part on separately determining the first PMI and the second PMI.

Aspect 16: The method of any of aspects 12 through 14, further comprising: determining a first PMI for the first joint transmission hypothesis based at least in part on a second PMI for the first joint transmission hypothesis, wherein the second capability of the UE is based at least in part on determining the first PMI based at least in part on the second PMI.

Aspect 17: The method of any of aspects 12 through 14, further comprising: jointly determining a first PMI for the first joint transmission hypothesis and a second PMI for the first joint transmission hypothesis, wherein the second capability of the UE is based at least in part on jointly determining the first PMI and the second PMI.

Aspect 18: The method of any of aspects 12 through 17, further comprising: determining, based at least in part on the configuration message, a second channel measurement resource configured for the first joint transmission hypothesis and a second single transmission hypothesis, wherein the second capability applies to the first channel measurement resource or the second channel measurement resource.

Aspect 19: The method of any of aspects 1 through 18, further comprising: determining, based at least in part on the configuration message, that the first channel measurement resource is configured for a second joint transmission hypothesis; and indicating, to the base station, a second capability of the UE to share at least one of processing unit occupation, resource occupation, or port occupation between the first joint transmission hypothesis and the second joint transmission hypothesis.

Aspect 20: The method of any of aspects 1 through 19, further comprising: receiving RRC signaling that enables or disables the second capability of the UE.

Aspect 21: A method for wireless communication at a base station, comprising: receiving an indication of a capability of a UE to use a channel measurement resource for both a joint transmission hypothesis and a single transmission hypothesis; and indicating, to the UE, a first channel measurement resource that is associated with a first transmission configuration indicator state, wherein the first channel measurement resource is configured for a first joint transmission hypothesis and a first single transmission hypothesis based at least in part on the capability of the UE.

Aspect 22: The method of aspect 21, further comprising: receiving a channel state information report for the first joint transmission hypothesis or for the first single transmission hypothesis, the channel state information report based at least in part on a channel measurement obtained using the first channel measurement resource.

Aspect 23: The method of any of aspects 21 through 22, wherein a first configuration message indicates a plurality of channel measurement resources including the first channel measurement resource, the method further comprising: transmitting a second configuration message that enables single transmission hypotheses for the plurality of channel measurement resources on an individual basis.

Aspect 24: The method of any of aspects 21 through 22, wherein a first configuration message indicates a plurality of channel measurement resources including the first channel measurement resource, the method further comprising: transmitting a second configuration message comprising a flag that enables single transmission hypotheses for each channel measurement resource in the plurality of channel measurement resources.

Aspect 25: The method of any of aspects 21 through 22, wherein a first configuration message indicates a plurality of pairs of channel measurement resources corresponding to respective joint transmission hypotheses, the method further comprising: transmitting a second configuration message that disables single transmission hypotheses for one or more pairs of the plurality of pairs.

Aspect 26: The method of any of aspects 21 through 25, further comprising: receiving an indication of a second capability of the UE to use a channel measurement resource for multiple joint transmission hypotheses; and configuring the first channel measurement resource for a second joint transmission hypothesis based at least in part on the second capability of the UE.

Aspect 27: The method of any of aspects 21 through 26, further comprising: receiving an indication of a quantity of transmission hypotheses for which the UE is capable of using a channel measurement resource; and configuring the first channel measurement resource for a second joint transmission hypothesis or a second single transmission hypothesis based at least in part on the quantity of transmission hypotheses.

Aspect 28: The method of any of aspects 21 through 27, further comprising: receiving an indication of a second capability of the UE to share at least one of processing unit occupation, resource occupation, or port occupation between the first joint transmission hypothesis and the first single transmission hypothesis; and configuring the UE with one or more channel state information report configurations based on the second capability.

Aspect 29: The method of aspect 28, wherein the indication of the second capability indicates the first channel measurement resource.

Aspect 30: The method of any of aspects 21 through 29, further comprising: receiving an indication of a second capability of the UE to share at least one of processing unit occupation, resource occupation, or port occupation between the first joint transmission hypothesis and a second joint transmission hypothesis; and configuring the UE with one or more channel state information report configurations based on the second capability.

Aspect 31: An apparatus for wireless communication at a UE, comprising a processor; memory coupled with the processor; and instructions stored in the memory and executable by the processor to cause the apparatus to perform a method of any of aspects 1 through 20.

Aspect 32: An apparatus for wireless communication at a UE, comprising at least one means for performing a method of any of aspects 1 through 20.

Aspect 33: A non-transitory computer-readable medium storing code for wireless communication at a UE, the code comprising instructions executable by a processor to perform a method of any of aspects 1 through 20.

Aspect 34: An apparatus for wireless communication at a base station, comprising a processor; memory coupled with the processor; and instructions stored in the memory and executable by the processor to cause the apparatus to perform a method of any of aspects 21 through 30.

Aspect 35: An apparatus for wireless communication at a base station, comprising at least one means for performing a method of any of aspects 21 through 30.

Aspect 36: A non-transitory computer-readable medium storing code for wireless communication at a base station, the code comprising instructions executable by a processor to perform a method of any of aspects 21 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a central processing unit, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting, to a network entity, a resource sharing capability of the UE to share a channel measurement resource for both a joint transmission hypothesis and a single transmission hypothesis;
   receiving, based at least in part on the resource sharing capability of the UE, a first configuration message indicating a plurality of channel measurement resources including a first channel measurement resource that is associated with a first transmission configuration indicator state and that is configured for a first joint transmission hypothesis;
   receiving a second configuration message that enables or disables single transmission hypotheses for the first channel measurement resource; and obtaining a channel measurement for both the first joint transmission hypothesis and a first single transmission hypothesis using the first channel measurement resource based at least in part on the first configuration message, the second configuration message, and the resource sharing capability of the UE.

2. The method of claim 1, wherein the
second configuration message enables single transmission hypotheses for the plurality of channel measurement resources on an individual basis.

3. The method of claim 1, wherein the
second configuration message comprising a flag that enables single transmission hypotheses for each channel measurement resource in the plurality of channel measurement resources.

4. The method of claim 1, wherein the first configuration message indicates a plurality of pairs of channel measurement resources corresponding to respective joint transmission hypotheses, and wherein the
second configuration message disables single transmission hypotheses for one or more pairs of the plurality of pairs.

5. The method of claim 1, wherein the resource sharing capability applies to a frequency range supported by the UE.

6. The method of claim 1, further comprising:
transmitting, to the network entity, a channel state information report for the first joint transmission hypothesis or for the first single transmission hypothesis, the channel state information report based at least in part on the channel measurement obtained using the first channel measurement resource.

7. The method of claim 1, further comprising:
determining that the UE supports simultaneous multi-beam reception; and
determining the resource sharing capability of the UE based at least in part on the UE supporting a simultaneous multi-beam reception capability.

8. The method of claim 1, further comprising:
determining, based at least in part on the resource sharing capability of the UE and a default configuration, that the first channel measurement resource corresponds to the first single transmission hypothesis.

9. The method of claim 1, further comprising:
determining the resource sharing capability of the UE based at least in part on a channel state information reporting capability of the UE.

10. The method of claim 1, further comprising:
transmitting a second resource sharing capability of the UE to use the first channel measurement resource for multiple joint transmission hypotheses.

11. The method of claim 1, further comprising:
transmitting a quantity of transmission hypotheses for which the UE is capable of using the first channel measurement resource.

12. The method of claim 1, further comprising:
transmitting, to the network entity based at least in part on the resource sharing capability of the UE, a second resource sharing capability of the UE to share at least one of processing unit occupation, resource occupation, or port occupation between the first joint transmission hypothesis and the first single transmission hypothesis.

13. The method of claim 12, further comprising:
determining the second resource sharing capability of the UE based at least in part on the first joint transmission hypothesis and the first single transmission hypothesis being configured to share one or more resources for interference measurements.

14. The method of claim 12, further comprising:
determining the second resource sharing capability of the UE based at least in part on a technique used by the UE to determine a first precoding matrix indicator (PMI) for the first joint transmission hypothesis and a second PMI for the first joint transmission hypothesis.

15. The method of claim 12, further comprising:
separately determining a first precoding matrix indicator (PMI) for the first joint transmission hypothesis and a second PMI for the first joint transmission hypothesis, wherein the second resource sharing capability of the UE is based at least in part on separately determining the first PMI and the second PMI.

16. The method of claim 12, further comprising:
determining a first precoding matrix indicator (PMI) for the first joint transmission hypothesis based at least in part on a second PMI for the first joint transmission hypothesis, wherein the second resource sharing capability of the UE is based at least in part on determining the first PMI based at least in part on the second PMI.

17. The method of claim 12, further comprising:
jointly determining a first precoding matrix indicator (PMI) for the first joint transmission hypothesis and a second PMI for the first joint transmission hypothesis, wherein the second resource sharing capability of the UE is based at least in part on jointly determining the first PMI and the second PMI.

18. The method of claim 12, further comprising:
determining, based at least in part on the first configuration message, a second channel measurement resource configured for the first joint transmission hypothesis and a second single transmission hypothesis, wherein the second resource sharing capability applies to the first channel measurement resource or the second channel measurement resource.

19. The method of claim 1, further comprising:
determining, based at least in part on the first configuration message, that the first channel measurement resource is configured for a second joint transmission hypothesis; and
transmitting, to the network entity, a second resource sharing capability of the UE to share at least one of processing unit occupation, resource occupation, or port occupation between the first joint transmission hypothesis and the second joint transmission hypothesis.

20. A method for wireless communication at a network entity, comprising:
receiving an indication of a resource sharing capability of a user equipment (UE) to share a channel measurement resource for both a joint transmission hypothesis and a single transmission hypothesis;
transmitting, to the UE, a first configuration message indicating a plurality of channel measurement resources including a first channel measurement resource that is associated with a first transmission configuration indicator state and that is configured for a first joint transmission hypothesis; and
transmitting, to the UE, a second configuration message that enables or disables single transmission hypotheses for the first channel measurement resource based at least in part on the resource sharing capability of the UE.

21. The method of claim 20, wherein
the second configuration message enables single transmission hypotheses for the plurality of channel measurement resources on an individual basis.

22. The method of claim 20, wherein
the second configuration message comprising a flag that enables single transmission hypotheses for each channel measurement resource in the plurality of channel measurement resources.

23. The method of claim 20, wherein the first configuration message indicates a plurality of pairs of channel measurement resources corresponding to respective joint transmission hypotheses, and wherein the
second configuration message disables single transmission hypotheses for one or more pairs of the plurality of pairs.

24. The method of claim 20, further comprising:
receiving a channel state information report for the first joint transmission hypothesis or for a first single transmission hypothesis, the channel state information report based at least in part on a channel measurement obtained using the first channel measurement resource.

25. The method of claim 20, further comprising:
receiving an indication of a second resource sharing capability of the UE to use the first channel measurement resource for multiple joint transmission hypotheses; and
configuring the first channel measurement resource for a second joint transmission hypothesis based at least in part on the second resource sharing capability of the UE.

26. The method of claim 20, further comprising:
receiving an indication of a quantity of transmission hypotheses for which the UE is capable of using the first channel measurement resource; and
configuring the first channel measurement resource for a second joint transmission hypothesis or a second single transmission hypothesis based at least in part on the quantity of transmission hypotheses.

27. The method of claim 20, further comprising:
receiving an indication of a second resource sharing capability of the UE to share at least one of processing unit occupation, resource occupation, or port occupation between the first joint transmission hypothesis and a first single transmission hypothesis; and
configuring the UE with one or more channel state information report configurations based on the second resource sharing capability.

28. The method of claim 20, further comprising:
receiving an indication of a second resource sharing capability of the UE to share at least one of processing unit occupation, resource occupation, or port occupation between the first joint transmission hypothesis and a second joint transmission hypothesis; and
configuring the UE with one or more channel state information report configurations based on the second resource sharing capability.

29. An apparatus for wireless communication at a user equipment (UE), comprising:
a memory; and
a processor coupled to the memory and configured to:
transmit, to a network entity, a resource sharing capability of the UE to share a channel measurement resource for both a joint transmission hypothesis and a single transmission hypothesis;
receive, based at least in part on the resource sharing capability of the UE, a first configuration message indicating a plurality of channel measurement resources including a first channel measurement resource that is associated with a first transmission configuration indicator state and that is configured for a first joint transmission hypothesis;
receive a second configuration message that enables or disables single transmission hypotheses for the first channel measurement resource; and
obtain a channel measurement for both the first joint transmission hypothesis and a first single transmission hypothesis using the first channel measurement resource based at least in part on the first configuration message, the second configuration message, and the resource sharing capability of the UE.

30. An apparatus for wireless communication at a network entity, comprising:
a memory; and
a processor coupled to the memory and configured to:
receive an indication of a resource sharing capability of a user equipment (UE) to share a channel measurement resource for both a joint transmission hypothesis and a single transmission hypothesis;
transmit, to the UE, a configuration message indicating a plurality of channel measurement resources including a first channel measurement resource that is associated with a first transmission configuration indicator state and that is configured for a first joint transmission hypothesis; and
transmit, to the UE, a second configuration message that enables or disables single transmission hypotheses for the first channel measurement resource based at least in part on the resource sharing capability of the UE.

\* \* \* \* \*